US008783563B1

(12) United States Patent
McGhie et al.

(10) Patent No.: US 8,783,563 B1
(45) Date of Patent: *Jul. 22, 2014

(54) CONVERSION OF LOYALTY POINTS FOR GAMING TO A DIFFERENT LOYALTY POINT PROGRAM FOR SERVICES

(71) Applicants: Sean I. McGhie, Boca Raton, FL (US); Brian K. Buchheit, Davie, FL (US)

(72) Inventors: Sean I. McGhie, Boca Raton, FL (US); Brian K. Buchheit, Davie, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/969,896

(22) Filed: Aug. 19, 2013

Related U.S. Application Data

(63) Continuation of application No. 13/863,556, filed on Apr. 16, 2013, now Pat. No. 8,511,550, and a continuation of application No. 13/899,023, filed on May 21, 2013, now Pat. No. 8,523,064, and a continuation of application No. 13/532,342, filed on Jun. 25, 2012, now Pat. No. 8,297,502, and a continuation of application No. 13/420,255, filed on Mar. 14, 2012, now abandoned, and a continuation-in-part of application No. 13/681,479, filed on Nov. 20, 2012, now Pat. No. 8,684,265, and a continuation-in-part of application No. 13/681,493, filed on Nov. 20, 2012, now Pat. No. 8,668,146.

(51) Int. Cl.
*G06K 5/00* (2006.01)
*G06Q 30/02* (2012.01)

(52) U.S. Cl.
CPC .................................. *G06Q 30/0227* (2013.01)
USPC ........... 235/380; 235/375; 235/379; 235/487; 463/25

(58) Field of Classification Search
CPC ....... G06Q 20/02; G06Q 20/06; G06Q 20/28; G06Q 20/381; G06Q 20/105; G06Q 30/00; G06Q 50/00; G06Q 90/00; G06Q 40/00; G07F 17/23; G07F 17/3248; G07F 17/34; G07F 17/3293

USPC ................. 235/380, 375, 379, 487, 486, 382; 705/14, 17, 14.32, 14.33, 39; 463/25, 463/20, 13

See application file for complete search history.

(56) References Cited

U.S. PATENT DOCUMENTS 3,573,747 A  4/1971  Adams et al.
(Continued)

FOREIGN PATENT DOCUMENTS

AU  6484498  11/1998
AU  2497399  11/1999
(Continued)

OTHER PUBLICATIONS

"U.S. Appl. No. 09/976,301 Response filed Oct. 24, 2006 to Final Office Action mailed Aug. 25, 2006, 6 pgs".

(Continued)

*Primary Examiner* — Edwyn Labaze
(74) *Attorney, Agent, or Firm* — Patents on Demand P.A.; Brian K. Buchheit; Scott M. Garrett

(57) ABSTRACT

A graphical user interface includes a conversion option to convert quantities of loyalty points of a loyalty program of an entity into different loyalty points of a different loyalty program of a commerce partner. The different loyalty points are accepted by a commerce partner as at least partial payment for commerce partner services provided by the commerce partner as part of the different loyalty program. The commerce partner does not accept the loyalty points as payment for commerce partner services, at least without requiring the loyalty points be first converted to different loyalty points. Responsive to a received selection of the conversion option, a computer presents within a user interface a quantity of available different loyalty points for use as payment for the commerce partner services. The quantity of available different loyalty points results from converting the subset of loyalty points into the quantity of available different loyalty points.

27 Claims, 3 Drawing Sheets

(56) References Cited

U.S. PATENT DOCUMENTS

| | | |
|---|---|---|
| 3,581,072 A | 5/1971 | Nymeyer |
| 3,652,795 A | 3/1972 | Wolf et al. |
| 3,918,716 A | 11/1975 | Nonaka et al. |
| 4,087,660 A | 5/1978 | Sedley |
| 4,251,867 A | 2/1981 | Uchida et al. |
| 4,358,672 A | 11/1982 | Hyatt et al. |
| 4,412,287 A | 10/1983 | Braddock, III |
| 4,473,825 A | 9/1984 | Walton |
| 4,518,098 A | 5/1985 | Fleischer |
| 4,546,241 A | 10/1985 | Walton |
| 4,582,324 A | 4/1986 | Koza et al. |
| 4,607,155 A | 8/1986 | Nao et al. |
| 4,609,812 A | 9/1986 | Drexler |
| 4,621,814 A | 11/1986 | Stephan et al. |
| 4,634,848 A | 1/1987 | Shinohara et al. |
| 4,674,044 A | 6/1987 | Kalmus et al. |
| 4,677,552 A | 6/1987 | Sibley, Jr. |
| 4,689,742 A | 8/1987 | Troy et al. |
| 4,695,053 A | 9/1987 | Vazquez |
| 4,700,055 A | 10/1987 | Kashkashian, Jr. |
| 4,701,601 A | 10/1987 | Francini et al. |
| 4,736,094 A | 4/1988 | Yoshida |
| 4,760,527 A | 7/1988 | Sidley |
| 4,764,666 A | 8/1988 | Bergeron |
| 4,789,928 A | 12/1988 | Fujisaki |
| 4,799,156 A | 1/1989 | Shivit et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff et al. |
| 4,837,422 A | 6/1989 | Dethloff et al. |
| 4,864,516 A | 9/1989 | Gaither et al. |
| 4,877,947 A | 10/1989 | Mori |
| 4,882,473 A | 11/1989 | Bergeron |
| 4,903,201 A | 2/1990 | Wagner |
| 4,910,672 A | 3/1990 | Off et al. |
| 4,912,310 A | 3/1990 | Uemura et al. |
| 4,941,090 A | 7/1990 | McCarthy |
| 4,942,090 A | 7/1990 | Morin |
| 4,949,256 A | 8/1990 | Humble |
| 4,968,873 A | 11/1990 | Dethloff |
| 4,982,346 A | 1/1991 | Girouard et al. |
| 5,025,372 A | 6/1991 | Burton et al. |
| 5,038,022 A | 8/1991 | Lucero |
| 5,056,019 A | 10/1991 | Schultz et al. |
| 5,063,507 A | 11/1991 | Lindsey et al. |
| 5,076,433 A | 12/1991 | Howes |
| 5,077,665 A | 12/1991 | Silverman et al. |
| 5,080,364 A | 1/1992 | Seidman |
| 5,101,353 A | 3/1992 | Lupien |
| 5,105,184 A | 4/1992 | Pirani et al. |
| 5,117,355 A | 5/1992 | McCarthy |
| 5,128,752 A | 7/1992 | Von Kohorn |
| 5,135,224 A | 8/1992 | Yamamoto |
| 5,136,501 A | 8/1992 | Silverman et al. |
| 5,142,578 A | 8/1992 | Matyas et al. |
| 5,168,446 A | 12/1992 | Wiseman |
| 5,173,851 A | 12/1992 | Off et al. |
| 5,179,517 A | 1/1993 | Sarbin et al. |
| 5,200,889 A | 4/1993 | Mori |
| 5,201,010 A | 4/1993 | Deaton et al. |
| 5,202,826 A | 4/1993 | McCarthy |
| 5,205,200 A | 4/1993 | Wright |
| 5,233,514 A | 8/1993 | Ayyoubi et al. |
| 5,237,620 A | 8/1993 | Deaton et al. |
| 5,243,515 A | 9/1993 | Lee |
| 5,256,863 A | 10/1993 | Ferguson et al. |
| 5,258,908 A | 11/1993 | Hartheimer et al. |
| 5,265,874 A | 11/1993 | Dickinson |
| 5,276,311 A | 1/1994 | Hennige |
| 5,276,312 A | 1/1994 | McCarthy |
| 5,280,422 A | 1/1994 | Moe et al. |
| 5,287,268 A | 2/1994 | McCarthy |
| 5,287,269 A | 2/1994 | Dorrough et al. |
| 5,290,033 A | 3/1994 | Bittner et al. |
| 5,297,031 A | 3/1994 | Gutterman et al. |
| 5,297,032 A | 3/1994 | Trojan et al. |
| 5,305,196 A | 4/1994 | Deaton et al. |
| 5,305,200 A | 4/1994 | Hartheimer et al. |
| 5,325,297 A | 6/1994 | Bird et al. |
| 5,327,508 A | 7/1994 | Deaton et al. |
| 5,329,589 A | 7/1994 | Fraser et al. |
| 5,332,076 A | 7/1994 | Ziegert |
| 5,344,144 A | 9/1994 | Cannon |
| 5,353,218 A | 10/1994 | De Lapa et al. |
| 5,369,705 A | 11/1994 | Bird et al. |
| 5,371,345 A | 12/1994 | LeStrange et al. |
| 5,373,440 A | 12/1994 | Cohen et al. |
| 5,375,055 A | 12/1994 | Togher et al. |
| 5,380,991 A | 1/1995 | Valencia et al. |
| 5,382,779 A | 1/1995 | Gupta |
| 5,388,165 A | 2/1995 | Deaton et al. |
| 5,393,061 A | 2/1995 | Manship et al. |
| 5,394,324 A | 2/1995 | Clearwater |
| 5,397,125 A | 3/1995 | Adams |
| 5,398,932 A | 3/1995 | Eberhardt et al. |
| 5,401,946 A | 3/1995 | Weinblatt |
| 5,402,872 A | 4/1995 | Clurman |
| 5,418,949 A | 5/1995 | Suzuki |
| 5,424,524 A | 6/1995 | Ruppert et al. |
| 5,426,281 A | 6/1995 | Abecassis |
| 5,429,361 A | 7/1995 | Raven et al. |
| 5,430,644 A | 7/1995 | Deaton et al. |
| 5,434,394 A | 7/1995 | Roach et al. |
| 5,440,634 A | 8/1995 | Jones et al. |
| 5,442,782 A | 8/1995 | Malatesta et al. |
| 5,448,471 A | 9/1995 | Deaton et al. |
| 5,453,601 A | 9/1995 | Rosen |
| 5,455,407 A | 10/1995 | Rosen |
| 5,457,306 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,485,510 A | 1/1996 | Colbert |
| 5,491,326 A | 2/1996 | Marceau et al. |
| 5,497,319 A | 3/1996 | Chong et al. |
| 5,502,636 A | 3/1996 | Clarke |
| 5,511,781 A | 4/1996 | Wood et al. |
| 5,513,102 A | 4/1996 | Auriemma |
| 5,529,361 A | 6/1996 | Bell |
| 5,535,276 A | 7/1996 | Ganesan |
| 5,535,407 A | 7/1996 | Yanagawa et al. |
| 5,537,314 A | 7/1996 | Kanter |
| 5,551,692 A | 9/1996 | Pettit et al. |
| 5,553,145 A | 9/1996 | Micali |
| 5,557,518 A | 9/1996 | Rosen |
| 5,557,728 A | 9/1996 | Garrett et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,578,808 A | 11/1996 | Taylor |
| 5,580,309 A | 12/1996 | Piechowiak |
| 5,586,936 A | 12/1996 | Bennett et al. |
| 5,590,038 A | 12/1996 | Pitroda |
| 5,592,560 A | 1/1997 | Deaton et al. |
| 5,596,994 A | 1/1997 | Bro |
| 5,598,557 A | 1/1997 | Doner et al. |
| 5,609,337 A | 3/1997 | Clapper, Jr. |
| 5,612,868 A | 3/1997 | Off et al. |
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,640,569 A | 6/1997 | Miller et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,649,118 A | 7/1997 | Carlisle et al. |
| 5,652,896 A | 7/1997 | Yamauchi et al. |

(56) References Cited

U.S. PATENT DOCUMENTS

| | | |
|---|---|---|
| 5,655,961 A | 8/1997 | Acres et al. |
| 5,657,389 A | 8/1997 | Houvener |
| 5,659,165 A | 8/1997 | Jennings et al. |
| 5,659,469 A | 8/1997 | Deaton et al. |
| 5,664,115 A | 9/1997 | Fraser |
| 5,668,591 A | 9/1997 | Shintani |
| 5,671,364 A | 9/1997 | Turk |
| 5,672,109 A | 9/1997 | Natanian |
| 5,673,322 A | 9/1997 | Pepe et al. |
| 5,674,128 A | 10/1997 | Holch et al. |
| 5,675,662 A | 10/1997 | Deaton et al. |
| 5,677,952 A | 10/1997 | Blakley et al. |
| 5,687,322 A | 11/1997 | Deaton et al. |
| 5,687,323 A | 11/1997 | Hodroff |
| 5,689,100 A | 11/1997 | Carrithers |
| 5,689,652 A | 11/1997 | Lupien et al. |
| 5,694,546 A | 12/1997 | Reisman |
| 5,697,611 A | 12/1997 | Kelly et al. |
| 5,706,457 A | 1/1998 | Dwyer et al. |
| 5,708,782 A | 1/1998 | Larson et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,725,428 A | 3/1998 | Achmuller |
| 5,727,165 A | 3/1998 | Ordish et al. |
| 5,729,594 A | 3/1998 | Klingman |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,745,573 A | 4/1998 | Lipner et al. |
| 5,749,075 A | 5/1998 | Toader et al. |
| 5,754,655 A | 5/1998 | Hughes |
| 5,758,126 A | 5/1998 | Daniels et al. |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,770,843 A | 6/1998 | Rose et al. |
| 5,771,291 A | 6/1998 | Newton et al. |
| 5,771,380 A | 6/1998 | Tanaka et al. |
| 5,774,553 A | 6/1998 | Rosen |
| 5,774,868 A | 6/1998 | Cragun et al. |
| 5,774,869 A | 6/1998 | Toader |
| 5,774,870 A | 6/1998 | Storey |
| 5,774,873 A | 6/1998 | Berent et al. |
| 5,775,870 A | 7/1998 | Hogan |
| 5,778,178 A | 7/1998 | Arunachalum |
| 5,778,213 A | 7/1998 | Shakib et al. |
| 5,778,367 A | 7/1998 | Wesinger, Jr. et al. |
| 5,779,242 A | 7/1998 | Kaufmann |
| 5,779,549 A | 7/1998 | Walker et al. |
| 5,794,210 A | 8/1998 | Goldhaber et al. |
| 5,794,219 A | 8/1998 | Brown |
| 5,794,230 A | 8/1998 | Horadan et al. |
| 5,799,285 A | 8/1998 | Klingman |
| 5,802,275 A | 9/1998 | Blonder |
| 5,803,500 A | 9/1998 | Mossberg |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |
| 5,818,914 A | 10/1998 | Fujisaki |
| 5,820,460 A | 10/1998 | Fulton |
| 5,822,230 A | 10/1998 | Kikinis et al. |
| 5,823,874 A | 10/1998 | Adams |
| 5,825,884 A | 10/1998 | Zdepski et al. |
| 5,826,244 A | 10/1998 | Huberman |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,835,896 A | 11/1998 | Fisher et al. |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,845,266 A | 12/1998 | Lupien et al. |
| 5,846,265 A | 12/1998 | McGregor et al. |
| 5,848,399 A | 12/1998 | Burke |
| 5,850,442 A | 12/1998 | Muftic |
| 5,851,148 A | 12/1998 | Brune et al. |
| 5,855,007 A | 12/1998 | Jovicic et al. |
| 5,855,008 A | 12/1998 | Goldhaber et al. |
| D404,436 S | 1/1999 | McGahn et al. |
| 5,857,175 A | 1/1999 | Day et al. |
| 5,857,188 A | 1/1999 | Douglas |
| 5,857,201 A | 1/1999 | Wright et al. |
| 5,857,203 A | 1/1999 | Kauffman et al. |
| 5,864,822 A | 1/1999 | Baker, III |
| RE36,116 E | 2/1999 | McCarthy et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,876,284 A | 3/1999 | Acres et al. |
| 5,882,261 A | 3/1999 | Adams |
| 5,882,262 A | 3/1999 | Balhorn |
| 5,884,056 A | 3/1999 | Steele |
| 5,884,247 A | 3/1999 | Christy |
| 5,884,277 A | 3/1999 | Khosla |
| 5,890,138 A | 3/1999 | Godin et al. |
| 5,892,827 A | 4/1999 | Beach et al. |
| 5,892,900 A | 4/1999 | Ginter et al. |
| 5,892,905 A | 4/1999 | Brandt et al. |
| 5,897,621 A | 4/1999 | Boesch et al. |
| 5,897,622 A | 4/1999 | Blinn et al. |
| 5,898,570 A | 4/1999 | Koon |
| 5,898,838 A | 4/1999 | Wagner |
| 5,899,980 A | 5/1999 | Wilf et al. |
| 5,902,184 A | 5/1999 | Bennett |
| 5,902,983 A | 5/1999 | Crevelt et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,905,974 A | 5/1999 | Fraser et al. |
| 5,905,975 A | 5/1999 | Ausubel |
| 5,907,830 A | 5/1999 | Engel et al. |
| 5,907,831 A | 5/1999 | Lotvin et al. |
| 5,909,023 A | 6/1999 | Ono et al. |
| 5,909,486 A | 6/1999 | Walker et al. |
| 5,909,544 A | 6/1999 | Anderson et al. |
| 5,911,418 A | 6/1999 | Adams |
| 5,913,203 A | 6/1999 | Wong et al. |
| 5,913,210 A | 6/1999 | Call |
| 5,914,472 A | 6/1999 | Foladare et al. |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,917,168 A | 6/1999 | Nakamura et al. |
| 5,918,211 A | 6/1999 | Sloane |
| 5,918,213 A | 6/1999 | Bernard et al. |
| 5,918,214 A | 6/1999 | Perkowski |
| 5,919,091 A | 7/1999 | Bell et al. |
| 5,920,847 A | 7/1999 | Kolling et al. |
| 5,922,074 A | 7/1999 | Richard et al. |
| 5,923,016 A | 7/1999 | Fredregill et al. |
| 5,924,072 A | 7/1999 | Havens |
| 5,924,080 A | 7/1999 | Johnson |
| 5,933,811 A | 8/1999 | Angles et al. |
| 5,933,827 A | 8/1999 | Cole et al. |
| 5,935,000 A | 8/1999 | Sanchez, III |
| 5,937,066 A | 8/1999 | Gennaro et al. |

(56) References Cited

U.S. PATENT DOCUMENTS

| | | |
|---|---|---|
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,941,771 A | 8/1999 | Haste, III |
| 5,941,772 A | 8/1999 | Paige |
| 5,943,241 A | 8/1999 | Nichols et al. |
| 5,944,790 A | 8/1999 | Levy |
| 5,945,653 A | 8/1999 | Walker et al. |
| 5,946,664 A | 8/1999 | Ebisawa |
| 5,947,820 A | 9/1999 | Morro et al. |
| 5,948,061 A | 9/1999 | Merriman et al. |
| 5,949,042 A | 9/1999 | Dietz, II et al. |
| 5,950,173 A | 9/1999 | Perkowski |
| 5,951,397 A | 9/1999 | Dickinson |
| 5,952,638 A | 9/1999 | Demers et al. |
| 5,953,005 A | 9/1999 | Liu |
| 5,955,961 A | 9/1999 | Wallerstein |
| 5,956,038 A | 9/1999 | Rekimoto |
| 5,956,695 A | 9/1999 | Carrithers et al. |
| 5,956,700 A | 9/1999 | Landry |
| 5,959,277 A | 9/1999 | Lucero |
| 5,966,685 A | 10/1999 | Flanagan et al. |
| 5,967,896 A | 10/1999 | Jorasch et al. |
| 5,969,318 A | 10/1999 | Mackenthun |
| 5,970,469 A | 10/1999 | Scroggie et al. |
| 5,970,470 A | 10/1999 | Walker |
| 5,971,277 A | 10/1999 | Cragun et al. |
| 5,974,135 A | 10/1999 | Breneman et al. |
| 5,974,398 A | 10/1999 | Hanson et al. |
| 5,974,412 A | 10/1999 | Hazlehurst et al. |
| 5,978,777 A | 11/1999 | Garnier |
| 5,979,757 A | 11/1999 | Tracy et al. |
| 5,980,385 A | 11/1999 | Clapper |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,987,500 A | 11/1999 | Arunachalum |
| 5,988,500 A | 11/1999 | Litman |
| 5,991,376 A | 11/1999 | Hennessy et al. |
| 5,991,406 A | 11/1999 | Lipner et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,993,316 A | 11/1999 | Coyle |
| 5,995,942 A | 11/1999 | Smith et al. |
| 5,996,997 A | 12/1999 | Kamille |
| 5,999,624 A | 12/1999 | Hopkins |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,177 A | 12/1999 | Sudia |
| 6,009,411 A | 12/1999 | Kepecs |
| 6,009,412 A | 12/1999 | Storey |
| 6,009,458 A | 12/1999 | Hawkins |
| 6,012,039 A | 1/2000 | Hoffman et al. |
| 6,012,045 A | 1/2000 | Barzilai et al. |
| 6,012,051 A | 1/2000 | Sammon, Jr. et al. |
| 6,012,636 A | 1/2000 | Smith |
| 6,014,594 A | 1/2000 | Heidel |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |
| 6,018,742 A | 1/2000 | Herbert, III |
| 6,021,399 A | 2/2000 | Demers et al. |
| 6,024,286 A | 2/2000 | Bradley et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,029,015 A | 2/2000 | Ishiguro |
| 6,030,288 A | 2/2000 | Davis et al. |
| 6,032,133 A | 2/2000 | Hilt et al. |
| 6,032,136 A | 2/2000 | Brake, Jr. et al. |
| 6,032,955 A | 3/2000 | Luciano et al. |
| 6,035,280 A | 3/2000 | Christensen |
| 6,035,281 A | 3/2000 | Crosskey et al. |
| 6,036,601 A | 3/2000 | Heckel |
| 6,038,321 A | 3/2000 | Torigai et al. |
| 6,039,244 A | 3/2000 | Finsterwald |
| 6,039,648 A | 3/2000 | Guinn |
| 6,041,308 A | 3/2000 | Walker et al. |
| 6,041,309 A | 3/2000 | Laor |
| 6,044,360 A | 3/2000 | Piccialio |
| 6,047,264 A | 4/2000 | Fisher et al. |
| 6,047,269 A | 4/2000 | Biffar |
| 6,048,269 A | 4/2000 | Burns |
| 6,049,778 A | 4/2000 | Walker et al. |
| 6,049,779 A | 4/2000 | Berkson |
| 6,052,469 A | 4/2000 | Johnson et al. |
| 6,052,670 A | 4/2000 | Johnson |
| 6,055,573 A | 4/2000 | Gardenswartz et al. |
| 6,058,371 A | 5/2000 | Dijan |
| 6,058,379 A | 5/2000 | Odom et al. |
| 6,058,482 A | 5/2000 | Liu |
| 6,061,448 A | 5/2000 | Smith et al. |
| 6,061,660 A | 5/2000 | Eggleston et al. |
| 6,062,980 A | 5/2000 | Luciano |
| 6,064,979 A | 5/2000 | Perkowski |
| 6,064,987 A | 5/2000 | Walker |
| 6,065,120 A | 5/2000 | Laursen et al. |
| 6,068,553 A | 5/2000 | Parker |
| 6,070,147 A | 5/2000 | Harms et al. |
| 6,072,468 A | 6/2000 | Hocker et al. |
| 6,072,870 A | 6/2000 | Nguyen et al. |
| 6,073,840 A | 6/2000 | Marion |
| 6,075,863 A | 6/2000 | Krishnan et al. |
| 6,075,971 A | 6/2000 | Williams et al. |
| 6,076,101 A | 6/2000 | Kamakura et al. |
| 6,078,898 A | 6/2000 | Davis et al. |
| 6,081,900 A | 6/2000 | Subramaniam et al. |
| 6,085,176 A | 7/2000 | Woolston |
| 6,085,320 A | 7/2000 | Kaliski, Jr. |
| 6,088,730 A | 7/2000 | Kato et al. |
| 6,089,982 A | 7/2000 | Holch et al. |
| 6,092,069 A | 7/2000 | Johnson et al. |
| 6,092,201 A | 7/2000 | Tumbull et al. |
| 6,094,486 A | 7/2000 | Marchant |
| 6,098,837 A | 8/2000 | Izawa |
| 6,101,483 A | 8/2000 | Petrovich et al. |
| 6,101,484 A | 8/2000 | Halbert et al. |
| 6,101,485 A | 8/2000 | Fortenberry et al. |
| 6,104,815 A | 8/2000 | Alcorn et al. |
| 6,105,001 A | 8/2000 | Masi et al. |
| 6,105,008 A | 8/2000 | Davis et al. |
| 6,105,865 A | 8/2000 | Hardesty |
| 6,110,041 A | 8/2000 | Walker et al. |
| 6,110,042 A | 8/2000 | Walker et al. |
| 6,113,098 A | 9/2000 | Adams |
| 6,113,495 A | 9/2000 | Walker et al. |
| 6,115,737 A | 9/2000 | Ely et al. |
| 6,119,137 A | 9/2000 | Smith et al. |
| 6,119,229 A | 9/2000 | Martinez et al. |
| 6,119,230 A | 9/2000 | Carter |
| 6,119,933 A | 9/2000 | Wong et al. |
| 6,124,947 A | 9/2000 | Sea |
| 6,126,542 A | 10/2000 | Fier |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,533 A | 10/2000 | Shell |
| 6,134,548 A | 10/2000 | Gottsman et al. |
| 6,138,107 A | 10/2000 | Elgamal |
| 6,138,911 A | 10/2000 | Fredregill et al. |
| 6,139,431 A | 10/2000 | Walker et al. |

(56) References Cited

U.S. PATENT DOCUMENTS

| | | |
|---|---|---|
| 6,141,161 A | 10/2000 | Sato et al. |
| 6,141,653 A | 10/2000 | Conklin |
| 6,141,684 A | 10/2000 | McDonald et al. |
| 6,144,984 A | 11/2000 | DeBenedictis et al. |
| 6,145,739 A | 11/2000 | Bertina et al. |
| 6,148,405 A | 11/2000 | Liao et al. |
| 6,151,589 A | 11/2000 | Aggarwal et al. |
| 6,154,214 A | 11/2000 | Uyehara et al. |
| 6,161,082 A | 12/2000 | Goldberg et al. |
| 6,161,096 A | 12/2000 | Bell |
| 6,162,122 A | 12/2000 | Acres |
| 6,163,771 A | 12/2000 | Walker et al. |
| 6,164,533 A | 12/2000 | Barton |
| 6,165,071 A | 12/2000 | Weiss |
| 6,168,522 B1 | 1/2001 | Walker |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,183,362 B1 | 2/2001 | Boushy |
| 6,183,366 B1 | 2/2001 | Goldberg et al. |
| 6,185,541 B1 | 2/2001 | Scroggie et al. |
| 6,185,545 B1 | 2/2001 | Resnick et al. |
| 6,186,893 B1 | 2/2001 | Walker et al. |
| 6,186,894 B1 | 2/2001 | Mayeroff |
| 6,189,103 B1 | 2/2001 | Nevarez et al. |
| 6,189,787 B1 | 2/2001 | Dorf |
| 6,190,256 B1 | 2/2001 | Walker et al. |
| 6,192,407 B1 | 2/2001 | Smith et al. |
| 6,193,608 B1 | 2/2001 | Walker et al. |
| 6,195,644 B1 | 2/2001 | Bowie |
| 6,195,677 B1 | 2/2001 | Utsumi |
| 6,196,458 B1 | 3/2001 | Walker et al. |
| 6,199,099 B1 | 3/2001 | Gershman et al. |
| 6,202,051 B1 | 3/2001 | Woolston |
| 6,205,418 B1 | 3/2001 | Li et al. |
| 6,205,553 B1 | 3/2001 | Stoffel et al. |
| 6,212,556 B1 | 4/2001 | Arunachalum |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,237,145 B1 | 5/2001 | Narasimhan et al. |
| 6,243,688 B1 | 6/2001 | Kalina |
| 6,243,691 B1 | 6/2001 | Fisher et al. |
| 6,244,958 B1 | 6/2001 | Acres |
| 6,246,996 B1 | 6/2001 | Stein et al. |
| 6,249,773 B1 | 6/2001 | Allard et al. |
| 6,266,647 B1 | 7/2001 | Fernandez |
| 6,266,653 B1 | 7/2001 | Shiobara et al. |
| 6,267,671 B1 | 7/2001 | Hogan |
| 6,273,820 B1 | 8/2001 | Haste, III |
| 6,275,789 B1 | 8/2001 | Moser et al. |
| 6,280,326 B1 | 8/2001 | Saunders |
| 6,280,328 B1 | 8/2001 | Holch et al. |
| 6,282,507 B1 | 8/2001 | Horiguchi et al. |
| 6,289,261 B1 | 9/2001 | Hiedel |
| 6,289,322 B1 | 9/2001 | Kitchen et al. |
| 6,292,769 B1 | 9/2001 | Flanagan et al. |
| 6,292,786 B1 | 9/2001 | Deaton et al. |
| 6,293,462 B1 | 9/2001 | Gangi |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,301,554 B1 | 10/2001 | Christy |
| 6,302,793 B1 | 10/2001 | Fertitta, III et al. |
| 6,306,035 B1 | 10/2001 | Kelly et al. |
| 6,311,976 B1 | 11/2001 | Yoseloff et al. |
| 6,312,333 B1 | 11/2001 | Acres |
| 6,315,665 B1 | 11/2001 | Faith |
| 6,317,727 B1 | 11/2001 | May |
| 6,319,125 B1 | 11/2001 | Acres |
| 6,321,208 B1 | 11/2001 | Barnett et al. |
| 6,321,210 B1 | 11/2001 | O'Brien et al. |
| 6,326,985 B1 | 12/2001 | Tazoe et al. |
| 6,327,573 B1 | 12/2001 | Walker et al. |
| 6,330,543 B1 | 12/2001 | Kepecs |
| 6,332,099 B1 | 12/2001 | Heidel |
| 6,332,126 B1 | 12/2001 | Peirce et al. |
| 6,332,128 B1 | 12/2001 | Nicholson |
| 6,332,157 B1 | 12/2001 | Mighdoli et al. |
| 6,336,009 B1 | 1/2002 | Suzumi et al. |
| 6,336,098 B1 | 1/2002 | Fortenberry et al. |
| 6,336,105 B1 | 1/2002 | Conklin et al. |
| 6,341,353 B1 | 1/2002 | Herman |
| 6,345,261 B1 | 2/2002 | Feidelson et al. |
| 6,352,175 B2 | 3/2002 | Izawa |
| 6,353,811 B1 | 3/2002 | Weissman |
| 6,354,492 B1 | 3/2002 | Powell et al. |
| 6,358,149 B1 | 3/2002 | Schneider et al. |
| 6,363,337 B1 | 3/2002 | Amith |
| 6,363,362 B1 | 3/2002 | Burfield et al. |
| 6,375,073 B1 | 4/2002 | Aebi et al. |
| 6,379,247 B1 | 4/2002 | Walker et al. |
| 6,389,427 B1 | 5/2002 | Faulkner |
| 6,394,907 B1 | 5/2002 | Rowe |
| 6,402,029 B1 | 6/2002 | Gangi |
| 6,408,281 B1 | 6/2002 | Shell et al. |
| 6,408,284 B1 | 6/2002 | Hilt et al. |
| 6,415,270 B1 | 7/2002 | Rackson et al. |
| 6,421,653 B1 | 7/2002 | May |
| 6,431,983 B2 | 8/2002 | Acres |
| 6,438,527 B1 | 8/2002 | Powar |
| 6,446,048 B1 | 9/2002 | Wells et al. |
| 6,450,407 B1 | 9/2002 | Freeman et al. |
| 6,452,498 B2 | 9/2002 | Stewart |
| 6,460,015 B1 | 10/2002 | Hetherington et al. |
| 6,460,020 B1 | 10/2002 | Pool et al. |
| 6,463,404 B1 | 10/2002 | Appleby |
| 6,473,729 B1 | 10/2002 | Gastaldo et al. |
| 6,476,830 B1 | 11/2002 | Farmer |
| 6,484,147 B1 | 11/2002 | Brizendine et al. |
| 6,484,940 B1 | 11/2002 | Dilday et al. |
| 6,486,768 B1 | 11/2002 | French et al. |
| 6,491,584 B2 | 12/2002 | Graham |
| 6,505,772 B1 | 1/2003 | Mollett et al. |
| 6,507,813 B2 | 1/2003 | Veditz et al. |
| 6,510,418 B1 | 1/2003 | Case et al. |
| 6,510,998 B1 | 1/2003 | Stanford et al. |
| 6,511,377 B1 | 1/2003 | Weiss |
| 6,522,889 B1 | 2/2003 | Aarnio |
| 6,523,012 B1 | 2/2003 | Glassman et al. |
| 6,532,448 B1 | 3/2003 | Higginson et al. |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,571,241 B1 | 5/2003 | Nosohara |
| 6,572,471 B1 | 6/2003 | Bennett |
| 6,574,239 B1 | 6/2003 | Dowling et al. |
| 6,575,832 B1 | 6/2003 | Manfredi et al. |
| 6,578,012 B1 | 6/2003 | Storey |
| 6,578,015 B1 | 6/2003 | Haseltine et al. |
| 6,579,179 B2 | 6/2003 | Poole et al. |
| 6,593,640 B1 | 7/2003 | Kalnitsky et al. |
| 6,594,640 B1 | 7/2003 | Postrel |
| 6,598,026 B1 | 7/2003 | Ojha et al. |
| 6,601,040 B1 | 7/2003 | Kolls |
| 6,607,136 B1 | 8/2003 | Atsmon et al. |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,629,081 B1 | 9/2003 | Cornelius et al. |
| 6,629,890 B2 | 10/2003 | Johnson |
| 6,631,358 B1 | 10/2003 | Ogilvie |
| 6,631,849 B2 | 10/2003 | Blossom |

(56) References Cited

U.S. PATENT DOCUMENTS

| | | |
|---|---|---|
| 6,645,077 B2 | 11/2003 | Rowe |
| 6,647,373 B1 | 11/2003 | Carlton-Foss |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,704,713 B1 | 3/2004 | Brett |
| 6,721,743 B1 | 4/2004 | Sakakibara |
| 6,732,161 B1 | 5/2004 | Hess et al. |
| 6,748,365 B1 | 6/2004 | Quinlan et al. |
| 6,748,367 B1 | 6/2004 | Lee |
| 6,771,291 B1 | 8/2004 | DiStenfano |
| 6,775,371 B2 | 8/2004 | Elsey et al. |
| 6,799,165 B1 | 9/2004 | Boesjes |
| 6,800,029 B2 | 10/2004 | Rowe |
| 6,813,609 B2 | 11/2004 | Wilson |
| 6,820,061 B2 | 11/2004 | Postrel |
| 6,824,066 B2 | 11/2004 | Weyant |
| 6,824,464 B2 | 11/2004 | Weil et al. |
| 6,826,594 B1 | 11/2004 | Pettersen |
| 6,829,586 B2 | 12/2004 | Postrel |
| 6,837,436 B2 | 1/2005 | Swartz et al. |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,857,022 B1 | 2/2005 | Scanlan |
| 6,857,961 B2 | 2/2005 | Soltys et al. |
| 6,865,547 B1 | 3/2005 | Brake et al. |
| 6,866,586 B2 | 3/2005 | Oberberger |
| 6,876,979 B2 | 4/2005 | Ling |
| 6,892,938 B2 | 5/2005 | Solomon |
| 6,895,386 B1 | 5/2005 | Bachman et al. |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,013,357 B2 | 3/2006 | Murdock et al. |
| 7,021,531 B2 | 4/2006 | Myttenaere |
| 7,025,674 B2 | 4/2006 | Adams et al. |
| 7,032,817 B2 | 4/2006 | Blank |
| 7,043,752 B2 | 5/2006 | Royer et al. |
| 7,072,864 B2 | 7/2006 | Brake, Jr. et al. |
| 7,076,453 B2 | 7/2006 | Jammes et al. |
| 7,096,190 B2 | 8/2006 | Postrel |
| 7,124,109 B2 | 10/2006 | Sakamoto et al. |
| 7,127,236 B2 | 10/2006 | Khan et al. |
| 7,127,414 B2 | 10/2006 | Awadallah et al. |
| 7,128,652 B1 | 10/2006 | Lavoie |
| 7,130,828 B2 | 10/2006 | Phillips et al. |
| 7,134,087 B2 | 11/2006 | Bushold et al. |
| 7,134,959 B2 | 11/2006 | Penrice |
| 7,137,883 B1 | 11/2006 | Falciglia |
| 7,146,342 B1 | 12/2006 | Angelin |
| 7,152,042 B1 | 12/2006 | Arkes |
| 7,154,481 B2 | 12/2006 | Cross et al. |
| 7,156,738 B2 | 1/2007 | Rowe |
| 7,163,145 B2 | 1/2007 | Cohagan et al. |
| 7,168,089 B2 | 1/2007 | Nguyen |
| 7,174,029 B2 | 2/2007 | Agostinelli et al. |
| 7,174,315 B2 | 2/2007 | Phillips et al. |
| 7,174,563 B1 | 2/2007 | Brownlie et al. |
| 7,187,947 B1 | 3/2007 | White et al. |
| 7,200,571 B1 | 4/2007 | Jenniges et al. |
| 7,201,660 B2 | 4/2007 | Kiely et al. |
| 7,206,768 B1 | 4/2007 | deGroeve et al. |
| 7,209,733 B2 | 4/2007 | Ortiz et al. |
| 7,212,279 B1 | 5/2007 | Feng |
| 7,239,226 B2 | 7/2007 | Berardi et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,296,282 B1 | 11/2007 | Koplar et al. |
| 7,298,226 B2 | 11/2007 | Shanbhag et al. |
| 7,300,351 B2 | 11/2007 | Thomas |
| 7,315,823 B2 | 1/2008 | Brondrup |
| 7,321,901 B1 | 1/2008 | Blinn et al. |
| 7,329,185 B2 | 2/2008 | Conover et al. |
| 7,329,187 B1 | 2/2008 | Holch et al. |
| 7,341,518 B2 | 3/2008 | Muskin |
| 7,349,867 B2 | 3/2008 | Rollins et al. |
| 7,360,693 B1 | 4/2008 | Sullivan |
| 7,360,699 B2 | 4/2008 | Cohagan et al. |
| 7,376,538 B1 | 5/2008 | Eatough |
| 7,387,571 B2 | 6/2008 | Walker |
| 7,390,264 B2 | 6/2008 | Walker |
| 7,398,225 B2 | 7/2008 | Voltmer et al. |
| 7,398,226 B2 | 7/2008 | Haines et al. |
| 7,410,422 B2 | 8/2008 | Fine |
| 7,424,411 B2 | 9/2008 | Ito |
| 7,424,617 B2 | 9/2008 | Boyd et al. |
| 7,428,498 B2 | 9/2008 | Voltmer et al. |
| 7,430,522 B2 | 9/2008 | Nakajima |
| 7,455,586 B2 | 11/2008 | Nguyen |
| 7,461,022 B1 | 12/2008 | Churchill et al. |
| 7,467,096 B2 | 12/2008 | Antonucci et al. |
| 7,496,524 B2 | 2/2009 | Voltmer et al. |
| 7,503,487 B2 | 3/2009 | Cohagan et al. |
| 7,562,810 B2 | 7/2009 | Rao et al. |
| 7,593,866 B2 | 9/2009 | Grove et al. |
| 7,599,881 B2 | 10/2009 | Likourezos et al. |
| 7,606,730 B2 | 10/2009 | Antonucci et al. |
| 7,610,244 B2 | 10/2009 | Likourezos et al. |
| 7,613,628 B2 | 11/2009 | Ariff et al. |
| 7,613,629 B2 | 11/2009 | Antonucci et al. |
| 7,618,324 B2 | 11/2009 | Gatto et al. |
| 7,627,528 B2 | 12/2009 | Likourezos et al. |
| 7,636,674 B2 | 12/2009 | Francis |
| 7,636,874 B2 | 12/2009 | Gutbrod et al. |
| 7,641,547 B2 | 1/2010 | Walker et al. |
| 7,677,968 B2 | 3/2010 | Schultz et al. |
| 7,680,688 B2 | 3/2010 | Hessburg et al. |
| 7,682,245 B2 | 3/2010 | Nguyen |
| 7,686,218 B2 | 3/2010 | Hessburg et al. |
| 7,690,998 B2 | 4/2010 | Okada |
| 7,698,185 B2 | 4/2010 | Hofer |
| 7,703,673 B2 | 4/2010 | Buchheit et al. |
| 7,716,085 B2 | 5/2010 | Stier |
| 7,729,950 B2 | 6/2010 | Mendizabal et al. |
| 7,747,463 B1 | 6/2010 | Phillips et al. |
| 7,753,781 B2 | 7/2010 | Storch |
| 7,762,886 B2 | 7/2010 | Pfennighausen et al. |
| 7,765,124 B2 | 7/2010 | Postrel |
| 7,771,278 B1 | 8/2010 | Muskin |
| 7,775,872 B2 | 8/2010 | Bleich et al. |
| 7,788,160 B2 | 8/2010 | Srinivasamurthy |
| 7,813,955 B2 | 10/2010 | Ariff et al. |
| 7,815,506 B2 | 10/2010 | Franklin et al. |
| 7,827,056 B2 | 11/2010 | Walker et al. |
| 7,827,057 B1 | 11/2010 | Walker et al. |
| 7,828,206 B2 | 11/2010 | Hessburg et al. |
| 7,828,652 B2 | 11/2010 | Nguyen |
| 7,835,977 B2 | 11/2010 | Singh et al. |
| 7,853,486 B2 | 12/2010 | Grove et al. |
| 7,856,376 B2 | 12/2010 | Storey |
| 7,856,377 B2 | 12/2010 | Cohagan et al. |
| 7,860,749 B2 | 12/2010 | Subramanian |
| 7,867,079 B2 | 1/2011 | Govender et al. |
| 7,867,081 B2 | 1/2011 | Schneider et al. |
| 7,870,058 B2 | 1/2011 | Maltzman |
| 7,873,562 B2 | 1/2011 | Maltzman |
| 7,877,313 B2 | 1/2011 | Singh |
| 7,886,011 B2 | 2/2011 | Buchheit |
| 7,895,115 B2 | 2/2011 | Bayyapu et al. |
| 7,895,118 B2 | 2/2011 | Glodjo et al. |

(56) References Cited

U.S. PATENT DOCUMENTS

| | | |
|---|---|---|
| 7,921,052 B2 | 4/2011 | Dabney et al. |
| 7,925,533 B2 | 4/2011 | Shaw et al. |
| 7,950,996 B2 | 5/2011 | Nguyen |
| 7,963,843 B2 | 6/2011 | Martin et al. |
| 7,970,689 B2 | 6/2011 | Glodjo et al. |
| 7,980,466 B2 | 7/2011 | Lee et al. |
| 7,988,553 B2 | 8/2011 | Kastner et al. |
| 7,993,198 B2 | 8/2011 | Walker et al. |
| 7,993,199 B2 | 8/2011 | Iddings et al. |
| 7,996,262 B2 | 8/2011 | Urban |
| 7,996,486 B2 | 8/2011 | Lambert |
| 8,001,007 B2 | 8/2011 | Grove et al. |
| 8,005,714 B2 | 8/2011 | Shaw et al. |
| 8,005,719 B2 | 8/2011 | Grove et al. |
| 8,012,009 B2 | 9/2011 | Iddings et al. |
| 8,015,103 B2 | 9/2011 | Watt, II et al. |
| 8,019,679 B2 | 9/2011 | Bennett et al. |
| 8,020,181 B2 | 9/2011 | Koplar et al. |
| 8,024,220 B2 | 9/2011 | Ariff et al. |
| 8,046,256 B2 | 10/2011 | Chien et al. |
| 8,050,968 B2 | 11/2011 | Antonucci et al. |
| 8,052,518 B1 | 11/2011 | Kelly et al. |
| 8,062,116 B1 | 11/2011 | Lutnick et al. |
| 8,065,182 B2 | 11/2011 | Voltmer et al. |
| 8,075,394 B2 | 12/2011 | Okada et al. |
| 8,079,905 B2 | 12/2011 | Nguyen |
| 8,095,428 B2 | 1/2012 | Penagulur et al. |
| 8,095,449 B2 | 1/2012 | Cui et al. |
| 8,100,758 B2 | 1/2012 | Walker et al. |
| 8,112,303 B2 | 2/2012 | Eglen et al. |
| 8,123,127 B2 | 2/2012 | McGhie et al. |
| 8,125,216 B2 | 2/2012 | Thomas et al. |
| 8,126,799 B2 | 2/2012 | Kellam et al. |
| 8,135,644 B2 | 3/2012 | Rowe |
| 8,137,181 B2 | 3/2012 | Bleich et al. |
| 8,160,933 B2 | 4/2012 | Nguyen et al. |
| 8,162,209 B2 | 4/2012 | Buchheit et al. |
| 8,180,671 B2 | 5/2012 | Cohagan et al. |
| 8,181,863 B1 | 5/2012 | McGhie et al. |
| 8,181,864 B1 | 5/2012 | McGhie et al. |
| 8,182,333 B2 | 5/2012 | Pacey |
| 8,182,340 B2 | 5/2012 | Korp |
| 8,182,344 B2 | 5/2012 | Bleich et al. |
| 8,186,583 B1 | 5/2012 | McGhie et al. |
| 8,199,742 B1 | 6/2012 | Croak et al. |
| 8,200,547 B2 | 6/2012 | Daman et al. |
| 8,200,553 B1 | 6/2012 | Hermreck et al. |
| 8,201,734 B1 | 6/2012 | McGhie et al. |
| 8,214,264 B2 | 7/2012 | Kasavin et al. |
| 8,234,162 B2 | 7/2012 | Lavin et al. |
| 8,234,163 B2 | 7/2012 | Shaw et al. |
| 8,234,164 B2 | 7/2012 | Walker et al. |
| 8,234,379 B2 | 7/2012 | Young et al. |
| 8,239,258 B2 | 8/2012 | Urban |
| 8,239,260 B2 | 8/2012 | Lavin et al. |
| 8,239,280 B1 | 8/2012 | Feinberg et al. |
| 8,239,487 B1 | 8/2012 | Hoffman et al. |
| 8,245,925 B1 | 8/2012 | McGhie et al. |
| 8,265,993 B2 | 9/2012 | Chien et al. |
| 8,267,315 B1 | 9/2012 | McGhie et al. |
| 8,282,490 B2 | 10/2012 | Arezina et al. |
| 8,292,741 B2 | 10/2012 | Burman et al. |
| 8,297,502 B1 | 10/2012 | McGhie et al. |
| 8,298,074 B1 | 10/2012 | Gibase et al. |
| 8,313,023 B1 | 11/2012 | McGhie et al. |
| 8,332,290 B1 | 12/2012 | Venturo et al. |
| 8,342,399 B1 | 1/2013 | McGhie et al. |
| 8,352,370 B1 | 1/2013 | White et al. |
| 8,360,838 B2 | 1/2013 | Nguyen |
| 8,364,556 B2 | 1/2013 | Nguyen et al. |
| 8,370,212 B2 | 2/2013 | Asher et al. |
| 8,380,849 B2 | 2/2013 | Lambert |
| 8,386,330 B1 | 2/2013 | Kulavade et al. |
| 8,407,083 B2 | 3/2013 | Bortolin et al. |
| 8,407,089 B2 | 3/2013 | Trively |
| 8,423,401 B2 | 4/2013 | Antonucci et al. |
| 8,429,024 B1 | 4/2013 | Hermreck et al. |
| 8,433,607 B2 | 4/2013 | MacLean et al. |
| 8,433,609 B2 | 4/2013 | Abhyanker et al. |
| 8,452,645 B2 | 5/2013 | Steinkamp et al. |
| 8,452,687 B2 | 5/2013 | Rowe |
| 8,458,048 B2 | 6/2013 | Arkes |
| 8,478,657 B2 | 7/2013 | Lee |
| 8,484,186 B1 | 7/2013 | Kapczynski et al. |
| 8,489,449 B2 | 7/2013 | Teicher |
| 8,511,550 B1 | 8/2013 | McGhie et al. |
| 8,523,063 B1 | 9/2013 | McGhie et al. |
| 8,540,152 B1 | 9/2013 | McGhie et al. |
| 2001/0007099 A1 | 7/2001 | Rau et al. |
| 2001/0009005 A1 | 7/2001 | Godin et al. |
| 2001/0012219 A1 | 8/2001 | Lee et al. |
| 2001/0023407 A1 | 9/2001 | Liyanearachchi et al. |
| 2001/0027436 A1 | 10/2001 | Tenembaum |
| 2001/0029455 A1 | 10/2001 | Chin et al. |
| 2001/0032137 A1 | 10/2001 | Bennett et al. |
| 2001/0032164 A1 | 10/2001 | Kim |
| 2001/0032182 A1 | 10/2001 | Kumar et al. |
| 2001/0032183 A1 | 10/2001 | Landry |
| 2001/0032878 A1 | 10/2001 | Tsiounis et al. |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034663 A1 | 10/2001 | Teveler et al. |
| 2001/0034720 A1 | 10/2001 | Armes |
| 2001/0037295 A1 | 11/2001 | Olsen |
| 2001/0039531 A1 | 11/2001 | Aoki |
| 2001/0039644 A1 | 11/2001 | Le Coz |
| 2001/0041610 A1 | 11/2001 | Luciano et al. |
| 2001/0044337 A1 | 11/2001 | Rowe |
| 2001/0046891 A1 | 11/2001 | Acres |
| 2001/0047308 A1 | 11/2001 | Kaminsky |
| 2001/0047342 A1 | 11/2001 | Cuervo |
| 2001/0049628 A1 | 12/2001 | Icho |
| 2001/0049647 A1 | 12/2001 | Sheehan et al. |
| 2001/0054003 A1 | 12/2001 | Chien et al. |
| 2001/0054006 A1 | 12/2001 | Lee et al. |
| 2001/0054010 A1 | 12/2001 | Bernabeo et al. |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0013774 A1 | 1/2002 | Morimoto |
| 2002/0016734 A1 | 2/2002 | McGill et al. |
| 2002/0020965 A1 | 2/2002 | Potter |
| 2002/0022743 A1 | 2/2002 | Jamieson et al. |
| 2002/0026348 A1 | 2/2002 | Fowler et al. |
| 2002/0026423 A1 | 2/2002 | Maritzen et al. |
| 2002/0029339 A1 | 3/2002 | Rowe |
| 2002/0038282 A1 | 3/2002 | Montgomery |
| 2002/0039923 A1 | 4/2002 | Cannon |
| 2002/0040344 A1 | 4/2002 | Preiser et al. |
| 2002/0041556 A1 | 4/2002 | Tsukamoto |
| 2002/0042835 A1 | 4/2002 | Pepin et al. |
| 2002/0045476 A1 | 4/2002 | Poole |
| 2002/0046110 A1 | 4/2002 | Gallagher |
| 2002/0046137 A1 | 4/2002 | Odom et al. |
| 2002/0046157 A1 | 4/2002 | Solomon |
| 2002/0049631 A1 | 4/2002 | Williams |
| 2002/0049664 A1 | 4/2002 | Hoffman et al. |
| 2002/0052940 A1 | 5/2002 | Myers et al. |
| 2002/0055874 A1 | 5/2002 | Cohen |
| 2002/0056044 A1 | 5/2002 | Andersson |
| 2002/0059103 A1 | 5/2002 | Anderson et al. |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069134 A1 | 6/2002 | Solomon |
| 2002/0069150 A1 | 6/2002 | Ni |
| 2002/0069184 A1 | 6/2002 | Tilly et al. |
| 2002/0072412 A1 | 6/2002 | Young |
| 2002/0073111 A1 | 6/2002 | Heyliger |

(56) References Cited

U.S. PATENT DOCUMENTS

| | | |
|---|---|---|
| 2002/0075844 A1 | 6/2002 | Hagen |
| 2002/0077173 A1 | 6/2002 | Luciano et al. |
| 2002/0077890 A1 | 6/2002 | Forsythe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082953 A1 | 6/2002 | Batham et al. |
| 2002/0082977 A1 | 6/2002 | Hammond et al. |
| 2002/0082990 A1 | 6/2002 | Jones |
| 2002/0086733 A1 | 7/2002 | Wang |
| 2002/0087468 A1 | 7/2002 | Ganesan et al. |
| 2002/0091580 A1 | 7/2002 | Wang |
| 2002/0091593 A1 | 7/2002 | Fowler |
| 2002/0095365 A1 | 7/2002 | Slavin et al. |
| 2002/0099562 A1 | 7/2002 | Bruce et al. |
| 2002/0099656 A1 | 7/2002 | Poh Wong |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111889 A1 | 8/2002 | Buxton et al. |
| 2002/0111907 A1 | 8/2002 | Ling |
| 2002/0111919 A1 | 8/2002 | Weller et al. |
| 2002/0112174 A1 | 8/2002 | Moratti et al. |
| 2002/0116257 A1 | 8/2002 | Helbig |
| 2002/0120513 A1 | 8/2002 | Webb et al. |
| 2002/0120548 A1 | 8/2002 | Etkin |
| 2002/0120554 A1 | 8/2002 | Vega |
| 2002/0123949 A1 | 9/2002 | VanLeeuwen |
| 2002/0123959 A1 | 9/2002 | Mozley et al. |
| 2002/0131565 A1 | 9/2002 | Scheuring et al. |
| 2002/0143612 A1 | 10/2002 | Barik et al. |
| 2002/0143614 A1 | 10/2002 | Clarkin et al. |
| 2002/0146018 A1 | 10/2002 | Kailamaki et al. |
| 2002/0147047 A1 | 10/2002 | Letovsky |
| 2002/0147655 A1 | 10/2002 | Say |
| 2002/0151359 A1 | 10/2002 | Rowe |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0174031 A1 | 11/2002 | Weiss |
| 2002/0174050 A1 | 11/2002 | Eynard et al. |
| 2002/0177479 A1 | 11/2002 | Walker |
| 2002/0194069 A1 | 12/2002 | Thakur et al. |
| 2002/0198043 A1 | 12/2002 | Chowdhry |
| 2003/0003996 A1 | 1/2003 | Nguyen |
| 2003/0004802 A1 | 1/2003 | Callegari |
| 2003/0004808 A1 | 1/2003 | Elhaossine et al. |
| 2003/0004809 A1 | 1/2003 | Palcic et al. |
| 2003/0004871 A1 | 1/2003 | Rowe |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0014350 A1 | 1/2003 | Duell et al. |
| 2003/0018523 A1 | 1/2003 | Rappaport et al. |
| 2003/0018885 A1 | 1/2003 | Landsman et al. |
| 2003/0022719 A1 | 1/2003 | Donald et al. |
| 2003/0030964 A1 | 2/2003 | Asao et al. |
| 2003/0032474 A1 | 2/2003 | Kaminkow |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0050861 A1 | 3/2003 | Martin et al. |
| 2003/0055722 A1 | 3/2003 | Perreault et al. |
| 2003/0055780 A1 | 3/2003 | Hansen et al. |
| 2003/0060264 A1 | 3/2003 | Chilton |
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0083952 A1 | 5/2003 | Simpson et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0105705 A1 | 6/2003 | Eyre |
| 2003/0106769 A1 | 6/2003 | Weiss |
| 2003/0110047 A1 | 6/2003 | Santosuosso |
| 2003/0115456 A1 | 6/2003 | Kapoor |
| 2003/0126013 A1 | 7/2003 | Shand |
| 2003/0130927 A1 | 7/2003 | Beck et al. |
| 2003/0130948 A1 | 7/2003 | Algiene et al. |
| 2003/0139975 A1 | 7/2003 | Perkowski |
| 2003/0148807 A1 | 8/2003 | Acres |
| 2003/0149619 A1 | 8/2003 | Stanley et al. |
| 2003/0163425 A1 | 8/2003 | Cannon, Jr. |
| 2003/0167213 A1 | 9/2003 | Jammes et al. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0217002 A1 | 11/2003 | Enborg |
| 2003/0228902 A1 | 12/2003 | Walker |
| 2003/0229584 A1 | 12/2003 | Brown |
| 2003/0236704 A1 | 12/2003 | Antonucci |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049423 A1 | 3/2004 | Kawashima et al. |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Macbeath et al. |
| 2004/0111366 A1 | 6/2004 | Schneider |
| 2004/0122736 A1 | 6/2004 | Bressler et al. |
| 2004/0128197 A1 | 7/2004 | Barn |
| 2004/0143500 A1 | 7/2004 | Lopez |
| 2004/0143501 A1 | 7/2004 | Lopez |
| 2004/0158492 A1 | 8/2004 | Lopez |
| 2004/0173673 A1 | 9/2004 | Potts |
| 2004/0186773 A1 | 9/2004 | George et al. |
| 2004/0199421 A1 | 10/2004 | Kurie et al. |
| 2004/0204990 A1 | 10/2004 | Lee et al. |
| 2004/0204991 A1 | 10/2004 | Monahan et al. |
| 2004/0215505 A1 | 10/2004 | Sullivan |
| 2004/0220854 A1 | 11/2004 | Postrel |
| 2004/0229671 A1 | 11/2004 | Stronach |
| 2004/0262381 A1 | 12/2004 | Mesaros |
| 2005/0000280 A1 | 1/2005 | Foster et al. |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnston et al. |
| 2005/0043082 A1 | 2/2005 | Peterson |
| 2005/0043992 A1 | 2/2005 | Cohagan et al. |
| 2005/0060225 A1 | 3/2005 | Postrel |
| 2005/0060455 A1 | 3/2005 | Murdock et al. |
| 2005/0071228 A1 | 3/2005 | Bortolin et al. |
| 2005/0080727 A1 | 4/2005 | Postrel |

(56) References Cited

U.S. PATENT DOCUMENTS

| | | |
|---|---|---|
| 2005/0080728 A1 | 4/2005 | Sobek |
| 2005/0080748 A1 | 4/2005 | Belobaba et al. |
| 2005/0096124 A1 | 5/2005 | Stronach |
| 2005/0102151 A1 | 5/2005 | Fuwa et al. |
| 2005/0107155 A1 | 5/2005 | Potts et al. |
| 2005/0137015 A1 | 6/2005 | Rogers |
| 2005/0143174 A1 | 6/2005 | Goldman |
| 2005/0149394 A1 | 7/2005 | Postrel |
| 2005/0177428 A1 | 8/2005 | Ganz |
| 2005/0177503 A1 | 8/2005 | Thomas |
| 2005/0177519 A1 | 8/2005 | Block |
| 2005/0182693 A1 | 8/2005 | Alivandi |
| 2005/0192864 A1 | 9/2005 | Ganz |
| 2005/0197904 A1 | 9/2005 | Baron et al. |
| 2005/0240392 A1 | 10/2005 | Munro et al. |
| 2005/0240472 A1 | 10/2005 | Postrel |
| 2005/0250415 A1 | 11/2005 | Barthold |
| 2005/0261056 A1 | 11/2005 | Smolucha |
| 2005/0267800 A1 | 12/2005 | Tietzen et al. |
| 2005/0284930 A1 | 12/2005 | Hefner et al. |
| 2005/0288998 A1 | 12/2005 | Venkiteswaran |
| 2006/0004629 A1 | 1/2006 | Neemann et al. |
| 2006/0010033 A1 | 1/2006 | Thomas |
| 2006/0015404 A1 | 1/2006 | Tran |
| 2006/0020511 A1 | 1/2006 | Postrel |
| 2006/0035692 A1 | 2/2006 | Kirby |
| 2006/0046827 A1 | 3/2006 | Saffari et al. |
| 2006/0052150 A1 | 3/2006 | Hedrick et al. |
| 2006/0063580 A1 | 3/2006 | Nguyen |
| 2006/0063587 A1 | 3/2006 | Manzo |
| 2006/0079150 A1 | 4/2006 | Filoseta |
| 2006/0089874 A1 | 4/2006 | George et al. |
| 2006/0100018 A1 | 5/2006 | Ganz |
| 2006/0136301 A1 | 6/2006 | Grovit |
| 2006/0148559 A1 | 7/2006 | Jordan |
| 2006/0148566 A1 | 7/2006 | Lakshminarasimha |
| 2006/0178217 A1 | 8/2006 | Jung |
| 2006/0178899 A1 | 8/2006 | Jung |
| 2006/0178964 A1 | 8/2006 | Jung |
| 2006/0178965 A1 | 8/2006 | Jung |
| 2006/0178966 A1 | 8/2006 | Jung |
| 2006/0178967 A1 | 8/2006 | Jung |
| 2006/0178968 A1 | 8/2006 | Jung |
| 2006/0178970 A1 | 8/2006 | Jung |
| 2006/0178972 A1 | 8/2006 | Jung |
| 2006/0178975 A1 | 8/2006 | Jung |
| 2006/0178985 A1 | 8/2006 | Jung |
| 2006/0195331 A1 | 8/2006 | Cluts et al. |
| 2006/0195376 A1 | 8/2006 | Jung |
| 2006/0195377 A1 | 8/2006 | Jung |
| 2006/0195378 A1 | 8/2006 | Jung |
| 2006/0195394 A1 | 8/2006 | Jung |
| 2006/0205481 A1 | 9/2006 | Dominellil |
| 2006/0224505 A1 | 10/2006 | Jung |
| 2006/0229976 A1 | 10/2006 | Jung |
| 2006/0248007 A1 | 11/2006 | Frieden et al. |
| 2006/0253321 A1 | 11/2006 | Heywood |
| 2006/0253329 A1 | 11/2006 | Ariff et al. |
| 2006/0259326 A1 | 11/2006 | Ambekar et al. |
| 2006/0259364 A1 | 11/2006 | Bressler et al. |
| 2006/0277103 A1 | 12/2006 | Fujita et al. |
| 2006/0281541 A1 | 12/2006 | Nguyen et al. |
| 2006/0287898 A1 | 12/2006 | Murashita et al. |
| 2007/0038515 A1 | 2/2007 | Postrel |
| 2007/0055440 A1 | 3/2007 | Denker et al. |
| 2007/0073582 A1 | 3/2007 | Jung |
| 2007/0078719 A1 | 4/2007 | Filak et al. |
| 2007/0087822 A1 | 4/2007 | Van Luchene |
| 2007/0112631 A1 | 5/2007 | Voltmer et al. |
| 2007/0112632 A1 | 5/2007 | Voltmer et al. |
| 2007/0112643 A1 | 5/2007 | Veres et al. |
| 2007/0118461 A1 | 5/2007 | Arkes et al. |
| 2007/0124204 A1 | 5/2007 | de Boer et al. |
| 2007/0129955 A1 | 6/2007 | Dalmia et al. |
| 2007/0143155 A1 | 6/2007 | Whitsett et al. |
| 2007/0167218 A1 | 7/2007 | Rothschild |
| 2007/0168266 A1 | 7/2007 | Questembert |
| 2007/0179839 A1 | 8/2007 | Neemann et al. |
| 2007/0179844 A1 | 8/2007 | Brannon et al. |
| 2007/0179850 A1 | 8/2007 | Ganjon et al. |
| 2007/0192187 A1 | 8/2007 | Becker et al. |
| 2007/0198335 A1 | 8/2007 | Edwards et al. |
| 2007/0219869 A1 | 9/2007 | Ariff et al. |
| 2007/0219924 A1 | 9/2007 | Shea et al. |
| 2007/0226074 A1 | 9/2007 | Ariff et al. |
| 2007/0239523 A1 | 10/2007 | Yi |
| 2007/0259709 A1 | 11/2007 | Kelly et al. |
| 2007/0265920 A1 | 11/2007 | Bistriceanu et al. |
| 2007/0276730 A1 | 11/2007 | Ahmed et al. |
| 2008/0021784 A1 | 1/2008 | Hessburg et al. |
| 2008/0021785 A1 | 1/2008 | Hessburg et al. |
| 2008/0040239 A1 | 2/2008 | Jacobi et al. |
| 2008/0077498 A1 | 3/2008 | Ariff et al. |
| 2008/0077499 A1 | 3/2008 | Ariff et al. |
| 2008/0086759 A1 | 4/2008 | Colson |
| 2008/0091482 A1 | 4/2008 | Whitsett et al. |
| 2008/0120219 A1 | 5/2008 | Chen |
| 2008/0147479 A1 | 6/2008 | Johnson |
| 2008/0182661 A1 | 7/2008 | Korp |
| 2008/0188308 A1 | 8/2008 | Shepherd et al. |
| 2008/0201224 A1 | 8/2008 | Owens et al. |
| 2008/0224822 A1 | 9/2008 | Alderucci et al. |
| 2008/0254893 A1 | 10/2008 | Larsen et al. |
| 2008/0274796 A1 | 11/2008 | Lube |
| 2008/0300990 A1 | 12/2008 | Guiton |
| 2008/0306826 A1 | 12/2008 | Kramer et al. |
| 2009/0023490 A1 | 1/2009 | Moshal et al. |
| 2009/0024483 A1 | 1/2009 | Urban |
| 2009/0063261 A1 | 3/2009 | Scribner et al. |
| 2009/0094118 A1 | 4/2009 | Antonucci et al. |
| 2009/0106112 A1 | 4/2009 | Dalmia et al. |
| 2009/0124384 A1 | 5/2009 | Smith et al. |
| 2009/0125402 A1 | 5/2009 | Voltmer et al. |
| 2009/0131143 A1 | 5/2009 | Kelly et al. |
| 2009/0156310 A1 | 6/2009 | Fargo |
| 2009/0171988 A1 | 7/2009 | Kikin-Gil |
| 2009/0177541 A1 | 7/2009 | Johnson et al. |
| 2009/0177594 A1 | 7/2009 | Williams |
| 2009/0191525 A1 | 7/2009 | Shepherd |
| 2009/0192890 A1 | 7/2009 | Steinkamp et al. |
| 2009/0216633 A1 | 8/2009 | Whitsett et al. |
| 2009/0276292 A1 | 11/2009 | Inselberg |
| 2009/0287570 A1 | 11/2009 | Adamousky et al. |
| 2009/0292599 A1 | 11/2009 | Angelos et al. |
| 2009/0299845 A1 | 12/2009 | Antonucci et al. |
| 2009/0319371 A1 | 12/2009 | Young |
| 2010/0018046 A1 | 1/2010 | Pollabauer |
| 2010/0030578 A1 | 2/2010 | Raouf et al. |
| 2010/0057550 A1 | 3/2010 | Nguyen |
| 2010/0057551 A1 | 3/2010 | Blaisdell |
| 2010/0069147 A1 | 3/2010 | Parhum |
| 2010/0076862 A1 | 3/2010 | Lefkowitz |
| 2010/0078475 A1 | 4/2010 | Lin et al. |
| 2010/0082481 A1 | 4/2010 | Lin et al. |
| 2010/0088174 A1 | 4/2010 | Cohagan et al. |
| 2010/0099485 A1 | 4/2010 | Sommer et al. |
| 2010/0106583 A1 | 4/2010 | Etheredge et al. |
| 2010/0131369 A1 | 5/2010 | Doan et al. |
| 2010/0138344 A1 | 6/2010 | Wong et al. |
| 2010/0169188 A1 | 7/2010 | Buchheit et al. |
| 2010/0174600 A1 | 7/2010 | Walker et al. |
| 2010/0211469 A1 | 8/2010 | Salmon et al. |
| 2010/0227675 A1 | 9/2010 | Luxton et al. |
| 2010/0248823 A1 | 9/2010 | Smith |
| 2010/0250290 A1 | 9/2010 | Lefkowitz et al. |
| 2010/0260426 A1 | 10/2010 | Huang et al. |
| 2011/0010205 A1 | 1/2011 | Richards |
| 2011/0015955 A1 | 1/2011 | Hessburg et al. |
| 2011/0035269 A1 | 2/2011 | Cohagan et al. |
| 2011/0119120 A1 | 5/2011 | Kern et al. |
| 2011/0124390 A1 | 5/2011 | Wilen |
| 2011/0137806 A1 | 6/2011 | Spence, III |
| 2011/0145047 A1 | 6/2011 | Chetty et al. |
| 2011/0145087 A1 | 6/2011 | Daman et al. |

(56) References Cited

U.S. PATENT DOCUMENTS

| | | |
|---|---|---|
| 2011/0151976 A1 | 6/2011 | Holloway |
| 2011/0166922 A1 | 7/2011 | Fuerstenberg |
| 2011/0183749 A1 | 7/2011 | Allen |
| 2011/0202395 A1 | 8/2011 | Swan et al. |
| 2011/0202400 A1 | 8/2011 | Bedard et al. |
| 2011/0207525 A1 | 8/2011 | Allen |
| 2011/0238503 A1 | 9/2011 | Naini |
| 2011/0256924 A1 | 10/2011 | McGhie et al. |
| 2011/0264474 A1 | 10/2011 | Lefkowitz |
| 2011/0269533 A1 | 11/2011 | Kelly et al. |
| 2011/0270657 A1 | 11/2011 | Urban |
| 2011/0275432 A1 | 11/2011 | Lutnick et al. |
| 2011/0295693 A1 | 12/2011 | Clavin et al. |
| 2011/0302020 A1 | 12/2011 | Ariff et al. |
| 2012/0016730 A1 | 1/2012 | Antonucci et al. |
| 2012/0026534 A1 | 2/2012 | Uruma |
| 2012/0030000 A1 | 2/2012 | Hanini et al. |
| 2012/0035998 A1 | 2/2012 | Balagopal et al. |
| 2012/0041810 A1 | 2/2012 | Hofer |
| 2012/0041813 A1 | 2/2012 | Ariff et al. |
| 2012/0046960 A1 | 2/2012 | Salta |
| 2012/0078704 A1 | 3/2012 | Spence, III |
| 2012/0165093 A1 | 6/2012 | Takehiro et al. |
| 2012/0191525 A1 | 7/2012 | Singh et al. |
| 2012/0221399 A1 | 8/2012 | Aloni et al. |
| 2012/0226535 A1 | 9/2012 | Subbarao et al. |
| 2012/0239520 A1 | 9/2012 | Lee |
| 2012/0271690 A1 | 10/2012 | Urban |
| 2012/0290368 A1 | 11/2012 | Im |
| 2012/0296763 A1 | 11/2012 | Lee |
| 2012/0310725 A1 | 12/2012 | Chien et al. |
| 2013/0019258 A1 | 1/2013 | Bhatia et al. |
| 2013/0103484 A1 | 4/2013 | McLaughlin |
| 2013/0124286 A1 | 5/2013 | Chen |
| 2013/0185131 A1 | 7/2013 | Sinha et al. |

FOREIGN PATENT DOCUMENTS

| | | |
|---|---|---|
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| AU | 2003200145 | 8/2003 |
| AU | 2002368184 | 3/2004 |
| AU | 2004250640 | 12/2004 |
| CA | 24060001 | 10/2001 |
| CN | 101159078 | 3/2013 |
| EP | 0251619 | 1/1988 |
| EP | 0254812 | 2/1988 |
| EP | 0308224 | 3/1989 |
| EP | 0525363 | 2/1993 |
| EP | 0542298 | 5/1993 |
| EP | 0590861 | 4/1994 |
| EP | 0949596 | 10/1999 |
| EP | 1014320 | 6/2000 |
| EP | 1107196 | 6/2001 |
| EP | 1141876 | 10/2001 |
| EP | 1351180 | 10/2003 |
| EP | 1399897 | 3/2004 |
| EP | 1494183 | 9/2005 |
| EP | 1330729 | 11/2005 |
| EP | 1598762 | 11/2005 |
| EP | 1746550 | 1/2007 |
| EP | 1750817 | 2/2007 |
| EP | 1787250 | 5/2007 |
| EP | 1879143 | 2/2009 |
| EP | 2533190 | 1/2013 |
| GB | 2261579 | 5/1993 |
| GB | 2301919 | 12/1996 |
| GB | 2319381 | 5/1998 |
| GB | 2296413 | 6/1999 |
| GB | 2333879 | 8/1999 |
| GB | 2380687 | 4/2003 |
| JP | 8235276 | 9/1996 |
| JP | 2000322490 | 11/2000 |
| JP | 2001000469 | 1/2001 |
| JP | 01338179 | 12/2001 |
| JP | 01357248 | 12/2001 |
| JP | 02092390 | 3/2002 |
| JP | 02109286 | 4/2002 |
| JP | 02207898 | 7/2002 |
| JP | 2003132224 | 5/2003 |
| JP | 04094643 | 3/2004 |
| WO | WO-9116691 | 10/1991 |
| WO | WO9215174 | 9/1992 |
| WO | WO-9323817 | 11/1993 |
| WO | WO-9416781 | 8/1994 |
| WO | 9503570 | 2/1995 |
| WO | WO-9512169 | 5/1995 |
| WO | WO-9517711 | 6/1995 |
| WO | WO-9633568 | 10/1996 |
| WO | WO-9636024 | 11/1996 |
| WO | WO-9641315 | 12/1996 |
| WO | WO-9704411 | 2/1997 |
| WO | WO-9713228 | 4/1997 |
| WO | WO-9743727 | 11/1997 |
| WO | WO-9748078 | 12/1997 |
| WO | WO-9809447 | 3/1998 |
| WO | 9910061 | 3/1999 |
| WO | WO-9926176 | 5/1999 |
| WO | WO-9930256 | 6/1999 |
| WO | WO-9952051 | 10/1999 |
| WO | WO-9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0038088 | 6/2000 |
| WO | 0017794 | 8/2000 |
| WO | 0058862 | 10/2000 |
| WO | 0062231 | 10/2000 |
| WO | 0079461 | 12/2000 |
| WO | 0101282 | 1/2001 |
| WO | 0115031 | 3/2001 |
| WO | 0116815 | 3/2001 |
| WO | 0129750 | 4/2001 |
| WO | 0137171 | 5/2001 |
| WO | 0139059 | 5/2001 |
| WO | 0152078 | 7/2001 |
| WO | 0152135 | 7/2001 |
| WO | 0153929 | 7/2001 |
| WO | 0157617 | 8/2001 |
| WO | 0164306 | 9/2001 |
| WO | 0171579 | 9/2001 |
| WO | 0171580 | 9/2001 |
| WO | 0104823 | 10/2001 |
| WO | 0173665 | 10/2001 |
| WO | 0179966 | 10/2001 |
| WO | 0180111 | 10/2001 |
| WO | 0182115 | 11/2001 |
| WO | 0205179 | 1/2002 |
| WO | 0231737 | 4/2002 |
| WO | 0241556 | 5/2002 |
| WO | 0248828 | 6/2002 |
| WO | 02058020 | 7/2002 |
| WO | 02063410 | 8/2002 |
| WO | 02069101 | 9/2002 |
| WO | 02077884 | 10/2002 |
| WO | 02079925 | 12/2002 |
| WO | 02097582 | 12/2002 |
| WO | 03025867 | 3/2003 |
| WO | 03038560 | 5/2003 |
| WO | 03083730 | 10/2003 |
| WO | 03098495 | 11/2003 |
| WO | 03102843 | 12/2003 |
| WO | 2004012111 | 2/2004 |
| WO | 2004019257 | 3/2004 |
| WO | 2004079506 | 9/2004 |
| WO | 2004090666 | 10/2004 |
| WO | 2004090666 A2 | 10/2004 |

(56) References Cited

FOREIGN PATENT DOCUMENTS

| | | |
|---|---|---|
| WO | 2004090666 A3 | 10/2004 |
| WO | 2004092849 A2 | 10/2004 |
| WO | 2004092894 | 10/2004 |
| WO | 2004095194 | 11/2004 |
| WO | 2004104950 | 12/2004 |
| WO | 2005003903 | 1/2005 |
| WO | 2005006113 | 1/2005 |
| WO | 2005059683 | 6/2005 |
| WO | 2005067431 | 7/2005 |
| WO | 2005073887 | 8/2005 |
| WO | 2005079422 | 9/2005 |
| WO | 2005082480 | 9/2005 |
| WO | 2005086899 | 9/2005 |
| WO | 2005096899 | 10/2005 |
| WO | 2006019359 | 2/2006 |
| WO | 2006019368 | 2/2006 |
| WO | 2006020413 | 2/2006 |
| WO | 2006022593 | 3/2006 |
| WO | 2006026203 | 3/2006 |
| WO | 2006043330 | 4/2006 |
| WO | 2006062925 | 6/2006 |
| WO | 2006138595 | 12/2006 |
| WO | 2007067712 | 11/2007 |
| WO | 2007106745 | 9/2008 |
| WO | 2008045650 | 10/2008 |
| WO | 2008147943 | 12/2008 |
| WO | 2009070889 | 6/2009 |
| WO | 2009094395 | 7/2009 |
| WO | 2009126452 | 10/2009 |
| WO | 2010019303 | 2/2010 |
| WO | 2011046469 | 4/2011 |
| WO | 2011026120 | 6/2011 |
| WO | 2012051455 | 4/2012 |
| WO | 2012162634 | 11/2012 |
| WO | 2013067035 | 5/2013 |

OTHER PUBLICATIONS

"U.S. Appl. No. 09/976,301 Response filed Dec. 19, 2006 to Advisory Action mailed Nov. 30, 2006, 16 pgs".
"U.S. Appl. No. 10/252,126, Final Office Action mailed Jun. 27, 2006, 11 pgs".
"U.S. Appl. No. 10/252,126, Non Final Office Action mailed Jan. 30, 2007, 9 pgs".
"U.S. Appl. No. 10/252,126, Non Final Office Action mailed Feb. 3, 2006, 8 pgs".
"U.S. Appl. No. 10/252,126, Non Final Office Action mailed Aug. 20, 2007, 8 pgs".
"U.S. Appl. No. 10/252,126, Response filed May 3, 2006 to Non Final Office Action mailed Feb. 3, 2006, 7 pgs".
"U.S. Appl. No. 10/252,126, Response filed Jun. 25, 2007 to Non Final Office Action mailed Jan. 30, 2007, 11 pgs".
"U.S. Appl. No. 10/252,127, Advisory Action mailed Jan. 10, 2007, 3 pgs".
"U.S. Appl. No. 10/252,127, Final Office Action mailed Oct. 6, 2006, 10 pgs".
"U.S. Appl. No. 10/252,127, Non Final Office Action mailed Mar. 21, 2006, 9 pgs".
"U.S. Appl. No. 10/252,127, Non Final Office Action mailed Jul. 11, 2007, 9 pgs".
"U.S. Appl. No. 10/252,127, Response filed Jun. 21, 2006 to Non Final Office Action mailed Mar. 21, 2006, 8 pgs".
"U.S. Appl. No. 10/252,127, Response filed Dec. 6, 2006 to Final Office Action mailed Oct. 6, 2006, 14 pgs".
"U.S. Appl. No. 10/252,129, Final Office Action mailed Dec. 27, 2006, 12 pgs".
"U.S. Appl. No. 10/252,129, Non Final Office Action mailed May 15, 2007, 10 pgs".
"U.S. Appl. No. 10/252,129, Non Final Office Action mailed Aug. 18, 2006, 10 pgs".
"U.S. Appl. No. 10/252,129, Response filed Aug. 13, 2007 to Non-Final Office Action mailed May 15, 2007, 16 pgs".

U.S. Appl. No. 10/252,129, Response filed Oct. 5, 2006 to Non Final Office Action mailed Aug. 18, 2006, 15 pgs.
"U.S. Appl. No. 10/252,129 Advisory Action mailed Mar. 13, 2007, 3 pgs".
U.S. Appl. No. 10/252,129 Response filed Feb. 22, 2007 to Final Office Action mailed Dec. 27, 2006, 14 pgs.
"U.S. Appl. No. 10/412,194, Non-Final Office Action mailed Mar. 13, 2008, 31 pgs."
"U.S. Appl. No. 10/412,194, Non-Final Office Action mailed Oct. 10 2008, 8 pgs".
"U.S. Appl. No. 10/412,194 Response filed Jun. 13 2008 to Non-Final Office Action mailed Mar. 13, 2008, 20 pgs."
"U.S. Appl. No. 10/607,587, Response filed Feb. 28 2008 to Non-Final Office Action mailed Nov. 30, 2007, 15 pgs."
"U.S. Appl. No. 10/607,587, Response filed Oct. 16, 2008 to Final Office Action mailed Apr. 21, 2008, 15 pgs."
"U.S. Appl. No. 10/607,587 Response filed Jun. 19, 2008 to Final Office Action mailed Apr. 21, 2008, 17 pgs".
"U.S. Appl. No. 10/607,587, Non-Final Office Action mailed Nov. 30, 2007, 19 pgs".
"U.S. Appl. No. 10/607,587, Final Office Action mailed Apr. 21, 2008, 30 Pages".
"U.S. Appl. No. 10/608,525, Advisory Action mailed Jul. 29, 2008, 3 pgs."
"U.S. Appl. No. 10/608,525, Final Office Action mailed May 1, 2008, 8 pgs".
"U.S. Appl. No. 10/608,525, Pre-Appeal Brief mailed Jul. 31, 2008, 2 pgs."
"U.S. Appl. No. 10/608,525, Response filed Jan. 11, 2008 to Non-Final Office Action mailed Sep. 11, 2007, 15 pgs."
"U.S. Appl. No. 10/608,525, Response filed Oct. 16, 2008 to Final Office Action mailed May 1, 2008, 17 pgs."
"U.S. Appl. No. 10/608,525 Response filed Jul. 1, 2008 to Final Office Action mailed May 1, 2008, 15 pgs."
"U.S. Appl. No. 10/608,525, Non-Final Office Action mailed Sep. 11, 2007, 6 pgs".
Piccinelli, G., et al. "E-service Composition: Supporting Dynamic Definition of Process-Oriented Negotiation Parameters", 12th International Workshop on Database and Expert System Applications. <http://computer.org/csdl/proceedings/dexa/2001/1230/00/12300727-abs.html>.
Seminerio, Maria. "When You Gotta Take Stock"; Dec. 11, 2000. <http://www.eweek.com/c/a/Finance-IT/When-You-Gotta-Take-Stock>.
Strassmann, Paul A. "The Impact of B2B"; Computerworld. Oct. 2, 2000. <http://www.computerworld.com/s/article/51535/The_impact_of_B2B?pageNumber=1>.
Turek, Norbert. "Online Portals Offer Bandwidth and Voice Services"; May 1, 2000. <http://www.informationweek.com/784/bandwidth.htm>.
Weiss, Scott. "Pan Am FF Program"; Business Wire. Oct. 15, 1996. <https://groups.google.com/forum/?hl=en#!msg/rec.travel.air/EzyB24GQzE4/H450aifuJSkJ>.
Notice of Allowance; U.S. Appl. No. 13/681,479; Mailing Date Sep. 6, 2013.
Notice of Allowance; U.S. Appl. No. 13/681,493; Mailing Date Sep. 23, 2013.
Aadvantage Auction; Bid on VIP Experiences with Aadvantage Miles; aa.com; Aug. 14, 2012.
Abby, Ellin; Personal Business; Listening to an Earful for Savings; The New York Times; Jan. 24, 1999.
Albright, Mark; Grocery savings via Web coupons; St. Petersburg Times; Jul 22, 1998.
American Eagle Outfitters, Inc; The clear choice for shopping this season is at American Eagle Outfitters, Warren, PA, Mar. 26; PR Newswire.
Bush, Michael; Emaginet Launches Personalized Web Coupons; Direct Marketing News; Nov. 18, 1998; p. 1-3.
Cathleen McCarthy; Turning miles directly into cash gains favor. Companies target shoppers with unredeemed rewards; CreditCards.com; Oct. 10, 2013.
"U.S. Appl. No. 09/734,044 Final Office Action maied Jan. 5, 2004, 7 pgs".

(56) References Cited

OTHER PUBLICATIONS

"U.S. Appl. No. 09/734,044 Final Office Action mailed Mar. 7, 2007, 15 pgs".
"U.S. Appl. No. 09/734,044 Final Office Action mailed Apr. 25, 2005, 11 pgs".
"U.S. Appl. No. 09/734,044 Non Final Office Action mailed Aug. 11, 2004, 13 pgs".
"U.S. Appl. No. 09/734,044 Non Final Office Action mailed Aug. 18, 2003, 7 pgs".
"U.S. Appl. No. 09/734,044 Non Final Office Action mailed Aug. 29, 2006, 15 pgs".
"U.S. Appl. No. 09/734,044 Response filed Oct. 9, 2003 to Non Final Office Action mailed Aug. 18, 2003, 11 pgs".
"U.S. Appl. No. 09/734,044 Response filed Nov. 29, 2006 to Non Final Office Action mailed Aug. 29, 2006, 9 pgs".
"U.S. Appl. No. 09/734,044 Response filed Dec. 13, 2004 to Non Final Office Action mailed Aug. 11, 2004, 13 pgs".
U.S. Appl. No. 09/905,525, Final Office Action mailed Jan. 10, 2008, 15 pgs.
"U.S. Appl. No. 09/905,525, Non-Final Office Action mailed Aug. 22, 2008, 17 pgs".
"U.S. Appl. No. 09/905,525, Response filed Mar. 27, 2008 to Final Office Action mailed Jan. 10, 2008, 17 pgs."
"U.S. Appl. No. 09/905,525, Response filed Jun. 10, 2008 to Final Office Action mailed Jan. 10, 2008, 20 pgs".
"U.S. Appl. No. 09/905,525, Response filed Sep. 25, 2007 to Non-Final Office Action mailed Jun. 25, 2007, 17 pgs."
"U.S. Appl. No. 09/905,525 Response filed Nov. 24, 2008 to Non-Final Office Action mailed Aug. 22, 2008, 17 pgs."
"U.S. Appl. No. 09/905,525, Advisory Action mailed May 2, 2008, 5 pgs".
"U.S. Appl. No. 09/905,525, Final Office Action mailed Jun. 29, 2006, 14 pgs".
"U.S. Appl. No. 09/905,525, Non Final Office Action mailed Jun. 25, 2007, 16 pgs".
"U.S. Appl. No. 09/905,525, Non Final Office Action mailed Dec. 12, 2005, 12 pgs".
"U.S. Appl. No. 09/905,525, Non Final Office Action mailed Dec. 18, 2006, 15 pgs".
"U.S. Appl. No. 09/905,525, Response filed Mar. 19, 2007 to Non Final Office Action mailed Dec. 18, 2006, 9 pgs".
"U.S. Appl. No. 09/905,525, Response filed Apr. 12, 2006 to Non Final Office Action mailed Dec. 12, 2005, 8 pgs".
"U.S. Appl. No. 09/905,525, Response filed Apr. 13, 2005 to Non Final Office Action mailed Dec. 14, 2004, 17 pgs".
"U.S. Appl. No. 09/905,525, Response filed Sep. 22, 2006 to Final Office Action mailed Jun. 29, 2006, 19 pgs".
"U.S. Appl. No. 09/905,525, Non Final Office Action mailed Dec. 14, 2004, 11 pgs".
"U.S. Appl. No. 09/969,449, Non-Final Office Action mailed Aug. 5, 2008, 8 pgs".
"U.S. Appl. No. 09/969,449 Final Office Action mailed Nov. 3, 2004, 10 pgs".
"U.S. Appl. No. 09/969,449 Final Office Action mailed Nov. 21, 2005, 16 pgs".
"U.S. Appl. No. 09/969,449 Final Office Action mailed Dec. 29, 2003, 9 pgs".
"U.S. Appl. No. 09/969,449 Non Final Office Action mailed Apr. 25, 2005, 9 pgs".
"U.S. Appl. No. 09/969,449 Non Final Office Action mailed May 11, 2004, 8 pgs".
"U.S. Appl. No. 09/969,449 Non Final Office Action mailed Jul. 9, 2003, 8 pgs".
"U.S. Appl. No. 09/969,449 Response filed Feb. 3, 2005 to Final Office Action mailed Nov. 3, 2004, 17 pgs".
"U.S. Appl. No. 09/969,449 Response filed Aug. 11, 2004 to Non Final Office Action mailed May 11, 2004, 12 pgs".
"U.S. Appl. No. 09/969,449 Response filed Aug. 25, 2005 to Non Final Office Action mailed Apr. 25, 2005, 12 pgs".
"U.S. Appl. No. 09/969,449 Response filed Oct. 9, 2003 to Non Final Office Action mailed Jul. 9, 2003, 12 pgs".
U.S. Appl. No. 09/976,301 Advisory Action mailed Sep. 30, 2005, 3 pgs.
U.S. Appl. No. 09/976,301 Advisory Action mailed Nov. 30, 2006, 3 pgs.
"U.S. Appl. No. 09/976,301 Final Office Action mailed Jul. 13, 2005, 11 pgs".
"U.S. Appl. No. 09/976,301 Final Office Action mailed Aug. 25, 2006, 14 pgs".
"U.S. Appl. No. 09/976,301 Non Final Office Action mailed Mar. 9, 2007, 13 pgs".
"U.S. Appl. No. 09/976,301 Non Final Office Action mailed Nov. 24, 2004, 31 pgs".
"U.S. Appl. No. 09/976,301 Non Final Office Action mailed Dec. 16, 2005, 17 pgs".
"U.S. Appl. No. 09/976,301 Response filed Apr. 6, 2005 to Non Final Office Action mailed Nov. 24, 2004, 15 pgs".
"U.S. Appl. No. 09/976,301 Response filed May 16, 2006 to Non Final Office Action mailed Dec. 16, 2005, 24 pgs".
"U.S. Appl. No. 09/976,301 Response filed Jun. 7, 2007 to Non Final Office Action mailed Mar. 9, 2007, 7 pgs".
"U.S. Appl. No. 09/976,301 Response filed Sep. 13, 2005 to Final Office Action mailed Jul. 13, 2005, 13 pgs".
"U.S. Appl. No. 09/976,301 Response filed Oct. 13, 2005 to Advisory Action mailed Jul. 13, 2005, 14 pgs".
Non Final Rejection dated Mar. 12, 2012; U.S. Appl. No. 13/359,104; pp. 1-8.
Notice of Allowance; U.S. Appl. No. 13/359,104; Mailing Date Apr. 13, 2012.
Non Final Rejection dated Mar. 6, 2012; U.S. Appl. No. 13/359,080; pp. 1-11.
Notice of Allowance; U.S. Appl. No. 13/359,080; Mailing date Apr. 11, 2012.
Non Final Rejection dated Jan. 10, 2012; U.S. Appl. No. 12/759,506; pp. 1-10.
Notice of Allowance; U.S. Appl. No. 12/759,506; Mail date Mar. 5, 2012.
Non Final Rejection dated Dec. 15, 2012; U.S. Appl. No. 12/720,743; pp. 1-10.
Notice of Allowance; U.S. Appl. No. 12/720,743; Mailing date Jan. 24, 2012.
Non Final Rejection dated May 12, 2009; U.S. Appl. No. 11/420,255; pp. 1-7.
Notice of Allowance; U.S. Appl. No. 11/420,255; Mailing Date Dec. 16, 2009.
Non Final Rejection dated Sep. 24, 2012; U.S. Appl. No. 13/542,451; pp. 1-6.
Notice of Allowance; U.S. Appl. No. 13/542,451; Mailing Date Nov. 5, 2012.
Non Final Rejection dated Sep. 7, 2012; U.S. Appl. No. 13/532,342; pp. 1-6.
Notice of Allowance; U.S. Appl. No. 13/532,342; Mailing Date Sep. 24, 2012.
Non Final Rejection dated Sep. 6, 2012; U.S. Appl. No. 13/531,904; pp. 1-6.
Notice of Allowance; U.S. Appl. No. 13/531,904; Mailing Date Sep. 19, 2012.
Non Final Rejection dated Jul. 17, 2012; U.S. Appl. No. 13/479,417; pp. 1-11.
Notice of Allowance; U.S. Appl. No. 13/479,417; Mailing Date Jul. 30, 2012.
Notice of Allowance; U.S. Appl. No. 13/441,365; Mailing Date Jun. 18, 2012.
Joan Magretta—"Why Business Models Matter" Harvard Business Review—May 2002 pp. 1-8.
"Combinable Miles Are the Stuff of Frequent Flyers' Dreams" <http://www.frequentflier.com/news-analysis/features/combinable-miles-are-the-stuff-of-frequent-flyers-dreams> May 25, 1998.
Gordon Carey, "Multi-tier Copay", Pharmaceutical Executive (Feb. 2000).

(56) References Cited

OTHER PUBLICATIONS

David S. Evans "Some Empirical Aspects of Multi-sided Platform Industries"—NERA Economic Consulting; Review of network Economics; vol. 2 Issue 3—Sep. 2003; pp. 191-209.
Uncles et. al. "Do Customer Loyalty programs Really Work"; MIT Sloan Management Review; Jul. 15, 1997.
"@wards online," Canadian Airlines, http://www.web.archive.org/web/19970704234541/www.cdnair.ca/cpi.html, Copyrigght 1994-1997.
Louise O'Brien & Charles Jones—"Do Rewards Really Creat Loyalty"?—Harvard Business Review; May-Jun. 1995; pp. 73-83.
Frederick F. Reichheld & Phil Schefter—"E-Loyalty—Your secret Weapon on the Web"—Harvard Business Review; Jul.-Aug. 2000; pp. 105-113.
Molly Plozay & Julie Bohn—"How Merchant-Funded Rewards Give new Life to Customer Loyalty programs"—First Data; Oct. 2008; firstdata.com—pp. 1-10.
Rajiv Lal—"Harrah's Entertainment Inc."—Harvard Business School; 9-502-011; Rev. Jun. 14, 2004; pp. 1-27.
Avery Johnson—"Hotels Take 'Know Your Customer' to New Level"—The Wall Street Journal—Feb. 7, 2006; p. D1.
Anthony T.H.Chin—"Impact of Frequent Flyer Programs on the Demand for Air Travel"—Department of Economics; National University of Singapore; Journal of Air Transportation; vol. 7, No. 2—2002; pp. 53-86.
Frederick F. Reichheld—"Loyalty-Based Management"—Harvard Business Review; Mar.-Apr. 1993; pp. 63-74.
Peter Jin Hong, creative director at Tribal DDB in Vancouver—"Digital Eye".
Business Insider. "The American Airlines—US Airways Merger Will Unite 2 Companies With Tumultuous Pasts" Feb. 14, 2013. http://www.businessinsider.com/questions-about-the-american-us-airways-merger-2013-2.
Christina Binkley—"Taking Retailers' Cues, Harrah's Taps into Science of Gambling"—The Wall Street Journal; Nov. 22, 2004—p. A1.
Werner Reinartz and V. Kumar—"The Mismanagement of Customer Loyalty"—Harvard Business Review; Jul. 2002 pp. 2-12.
KN Llewellyn—Meet Negotiable Instruments; Columbia Law Review 1944.
US General Accounting Office—Report to Congressional Requesters: Aviation Competition—"Effects on Consumers From Domestic Airline Alliances Vary". Jan. 1999.
Baig, E. "Going Once. Going Twice. Cybersold!" Business week; Jul. 31, 1997.
American Express has added Virgin Atlantic and Hawaiian Airlines to its Flight Finder feature under its Membership Rewards program. ( Loyalty Programs ); Business Traveler , v 21 , n 1 , p. 26; Dec. 2007.
EDebitPay Rewards: BSP to provide custom rewards-mall for EDP; Business Wire , p NA; Jan. 7, 2008.
"New Evidence about Positive Three-Tier Co-pay Performance Presented at Express Scripts 2000 Outcomes Conference", PR Newswire Association, Inc. (Jun. 28, 2000).
"Shell Introduces Optional Credit Card", The Associated Press (Sep. 4, 1985).
http://www.marketingmagazine.co.uk/article/158930/beenz-founder-creates-voucher-loyalty-programme-mobiles; Marketing; Sep. 25, 2002.
Mediappraise Receives National Award for Web-based Technology That Enables Companies to Solve Thorny HR Problem; Dec. 15, 1998; Business Wire; http://www.thefreelibrary.com/_/print/PrintArticle.aspx?id=53400697.
Om et al.; Cash Machines offer a whole lotto money for withdrawl; an unfortunate juxtaposition; block that metaphor!; something street talk; fishy in springfield; State street Sears?; Champion as underdog; A 'Whole Language' graduate; Crain's Chicago Business; Jun. 17, 1995.
Piccinelli, G., et al. "E-service Composition: Supporting Dynamic Definition of Process-Oriented Negotiation Parameters", 12th International Workshop on Database and Expert System Applications. <http://computer.org/csdl/proceedings/dexa/2001/1230/00/12300727-abs.html>; Sep. 2007.
San Luis Obispo, CA; At Sports Superstore Online, Shoppers Get More for Their Money; 10,000 Reasons to Shop at Sports Superstore Online; Business Wire; Dec. 4, 1998.
Strassmann, Paul A. "The Impact of B2B"; Computerworld. Oct. 2, 2000. <http://www.computerworld.com/s/article/51535/The_impact_of B2B?pageNumber=1>.
What is MilePoint?; Wayback machine; Aug. 1, 2001.
Patch, K. Sled, Internic Debut Internet Services; PC Week, 1994.
Phillips offers customers financing through citicorp. (Phillips Medical Systems North America, Citicorp North America Inc.); Health Industry Today; Jun. 1, 1991.
Points.com; "Stuff it"; Dec. 10, 2005; wayback machine.
Rent from NetFlix.com. Buy from Amazon.com; WaybackMachine; Nov. 5, 1999.
Edmund Sanders; Here's the Deal on Playing Card Games; Chicago Tribune; Business; Aug. 18, 1997.
Service helps hospitals shop online; Link-Up; Jun. 2000, vol. 17, Issue 3, p. 14.
Sinclair Stewart; To Mail or Not to Mail?; Strategy bold vision brand new ideas; Oct. 12, 1998.
Sarah Stambler; Marketing with Technology News; An Emerging Digital Trend: Living in the age of electronic proxy; Dec. 1998; vol. 8, issue 4.
Tecmark's Channel Loyalty Marketing programs engage and reward the people who are selling your products; http://tecmarkloyalty.com/loyaltyservices/channel/; Aug. 14, 2012.
WellsPark Group Launches "V.I.P. Rewards"; the Most Comprehensive Relationship Marketing Program Ever Created by a Mall Developer; Business Wire; May 19, 1998.
Renee Wijnen; CUC-HFS merger expected to yield an additional 2 million club members; Direct Marketing News; Jan. 26, 1998.
Amazon.com and Netflix.com Establish Promotional Relationship for the Sale and Rental of DVD Titles Business Wire Dec. 4, 1998, 3 pp.
Block, Valerie. "GM turns up the heat with plan to cross-sell some financial products." Nov. 18, 1994, http://www.americanbanker.com/issues/159_150/-49630-1.html?zkPrintable=true.
Beneficial, Casual Male Team Up on Card, American Banker. May 4, 1998. http://www.americanbanker.com.
Bloom, Jennifer Kingson. "Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 page.
Microsoft and First USA Announces $90 Million Online Advertising Alliance EDP Weekly's IT Monitor Nov. 2, 1998, 2 pp.
Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
Armstrong, Larry, "The Free-PC Game: Lure 'Em in and Lock 'Em Up," Business Week, Information Technology, Jul. 19, 1999, 1 pg.
Shoppers Charge Accounts Co. to Administer Private Label Credit Card for Lew Magram Ltd; Program Marks SCA,s Entry into Retail Catalog/Mail Order Industry PR Newswire Jun. 29, 1998, 6 pp.
Non Final Rejection dated Mar. 6, 2012; U.S. Appl. No. 13/359,120; pp. 1-7.
Souccar, Miriam K. "Epidemic of Rate Shopping Spurs a Search for remedies," Jan. 7, 1999, Copyright 1999 American Banker, Inc.
Jay Jacobs Inc. Introduces Private Label Credit Card, Business Wire May 18, 1998, 1 page.
Meece, Mickey "Big Finance Companies May Want Piece of Limited's Private-Label Card Program", The American Banker Apr. 12, 1995, 2 pp.
Points Earn Little Credit as Cardholders Fail to Cash in Birmingham Post May 9, 1998, 2 pp.
Notice of Allowance; U.S. Appl. No. 13/359,120; Mailing Date Apr. 18, 2012.
Wald, Matthew L. "Spending It; Untying Cellular Phones From Those Annual Contracts" The New York Times Mar. 15, 1998, 2 pp.

(56) References Cited

OTHER PUBLICATIONS

Sanders, Edmund "Tricky Business; The Magic of Rebate Cards can Quickly Disappear", Chicago Tribune Aug. 18, 1997, 3 pp.

Simon, Ruth "Make Sure Your Rebate Card Still Delivers the Goods", Money Aug. 1997, 2 pp.

Selasky, Susan "Easy-To-Swallow Savings; Diner Credit Cards Serve Wide menu of Discounts", Pittsburgh Post-Gazette Dec. 5, 1996, 3 pp.

Chemical Bank and AT&T Smart Cards form Strategic Alliance, www.att.com/press/1193/931117.blb.html, 3 pp.

Kristof, Kathy "Card Sharks are in Season; be Wary of Discounts and Rebates as You Shop Around for Good Credit Deals", Chicago Tribune, Nov. 23, 1993, 2 pp.

Wessel, Harry "Rewarding Experience?; Credit Cards Offering Bonuses Not for Everyone", Chicago Poet-Gazette Dec. 5, 1996, 3 pp.

Ross, Chuck et al., "Coke Card promotion set for '98", (http //adage com/news.sub.--and.sub.--features/features/19971117/article3 html), Copyright Nov. 1997, 2 pp.

Singletary, Michelle, "Electronic World, Unchecked Problem?", The Washington Post, Mar. 4, 1997, Section: Financial, p. C01, 4 pp.

Cox, Beth, "Visa, Travelweb Enter Online Marketing Partnership," Internetnews.com, Jan. 21, 1999, 1 pg.

Tedesco, Richard. "Pactel Pushes Net Access." Broadcasting & Cable. Jun. 3, 1996, pp. 64-65.

Colman, Price. "Cross-marketing Cuts Cable Bills." Broadcasting & Cable. Jul. 15, 1996, p. 44, 2 pp.

O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. col. 2 at p. 1, 4 pp.

Let's Play the Cash Register Receipts Lottery, The New York Times, Dec. 25, 1990, Section: Section 1, p. 30, col. 4, Editorial Desk, 1 pg.

Dennis, Sylvia. "Visa Gets ready for Interactive Set-Top Boxes," Newsbytes, Dec. 14, 1998, 2 pp.

Winn-Dixie/The Salvation Army Report Contributions for War Against Hunger, PR Newswire, Jun. 10, 1993, Section: Financial News, 1 pg.

Armstrong, Larry. "Coupon Clippers, save Your Scissors," Vons Supermarkets are Revolutionizing the Delivery of Discounts. Business week, Jun. 20, 1994, No. 3377 at p. 164, 2 pp.

Brochure: "MyPoints (R)", MotivationNet, Inc. (TM), Homepage: www.mypoints.com, Copyright: Apr. 1998, 29 pp.

Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.

Iverson, Mark. "DataCard Partners With CSI to Offer Card-Based Loyalty Solution to Merchants." Jul. 9, 1998; http://www.thefreelibrary.com/_/print/PrintArticle.aspx?id=20883274.

Cardbriefs: Stored-Value Card Designed for Casinos, The American Banker, Oct. 31, 1995, Section: Credit/Debit/ATMS, 1 pg.

WAP WTLS: Wireless Application Protocol Wireless Transport Layer Security Specification, Wireless Applications Forum, Limited, Feb. 18, 2000. [Retrieved on Jan. 19, 2009]. Retrieved from the Internet <Oct. 7, 2008>.

"Fallon: UK Retailers Loyal Customer 'Card Wars' Prove costly (Most major retailers in the UK have grown their sales over the past 2 years by lunching loyalty-card program"; Supermarket News, May 5, 1997; vol. 47, No. 18, p. 57.

Fickenscher, Lisa, "Merchant: American Express Seeks to Mine Its Data on Cardholder Spending Patters", The American Banker, Mar. 24, 1997, Credit/Debit/ATMS, 2 pp.

Fickenscher, Lisa, "Amex to Start Free Rewards Program with Discounts on Merchandise", The American Banker, Oct. 18, 1996, Section: Credit/Debit/ATMS, p. 10, 2 pp.

Fitzgerald, Kate, "Amex program moves loyalty to next level: Custom Extras finds a medium customers can't ignore: Billing Statements", Advertising Age, Nov. 4, 1996, Section: News, 2 pp.

Amato-McCoy, Deena, "Co-Branded Acme Credit Card Rewards Loyal Users" Supermarket News, Jun. 15, 1998, Section: p. 17, ISSN: 0039-5803, 2 pp. cited by DataCard Partners With CSI to Offer Card-Based Loyalty Solution to Merchants, Business Wire, Jul. 9, 1998, 1 pg.

Notice of Allowance; U.S. Appl. No. 13/441,365; Mailing Date Jun. 16, 2012.

Non Final Rejection dated May 4, 2012; U.S. Appl. No. 13/428,656; pp. 1-6.

Notice of Allowance; U.S. Appl. No. 13/428,656; Mailing Date May 15, 2012.

Yuh-Jzer Joung; On Personal data license design and negotiation; Jul. 26-28, 2005; Computer Software and Application Conference.

"Government Agencies Can Procure Materials." Link-Up. Jan./Feb. 2000, vol. 17, Issue 1, p. 19.

"AT&T Offers Ideas for Last-Minute Gifts and Stocking Stuffers." Business Wire. Dec. 21, 1994.

"Continental Airlines Offers Grammy Awards Tickets at the OnePass Online Auction." PR Newswire. Jan. 23.

"Personal Optimized Decision/Transaction Program"; IBM Technical Disclosure Bulletin. TDB v38 n1, Jan. 1995, p. 83-84.

"How to Earn and Redeem Miles on Continental Airlines"; OnePass Program Guide. May 2002.

"Web Beacon", <http://www.webopedia.com/TERM/W/Web-beacon.html>. Aug. 21, 2003.

Asbrand, Deborah. "Taking Stock in Tradingexchanges"; EDN Network; Apr. 1, 2000. <http://www.edn.com/electronics-news/4360134/Taking-stock-in-tradingexchanges>.

Dalton, Gregory. "Going, Going, Gone!: E-commerce is leading to an anything-goes environment of online bidding and dynamic pricing" <http://www.dbliss.net/900%20-%20GENERAL/Articles/e-commerce_bidding.txt>, Nov. 14, 2013.

Edwards, Morris. "New B2B Player Spreads Benefits of E-commerce"; Communications News; Jan. 1, 2001 <http://www.thefreelibrary.com?/_/print/PrintArticle.aspx?id=71060774>.

Fisher, Dennis. "More Goods on the Block"; eWeek; Dec. 18, 2000. <http://www.eweek.com/c/a/Web-Services-Web-20-and-SOA/More-Goods-on-the-Block>.

Franse, Karen. "Distribution Briefs"; CRN; Mar. 22, 2002. <http://www.crn.com/news/channel-programs/18818846/distribution-briefs.htm>.

Furger, Roberta. "Working the Web Bazaar"; Computerworld; Mar. 20, 2000. <http://www.computerworld.com.au/article/103901/working_web_bazarr>.

Kumar, Manoj. "Sales Promotions on the Internet". IBM Research Division, T.J. Watson Research Center, Yorktown Heights, NY 10598. 3rd USENIX Workshop on Electronic Commerce. Aug. 31-Sep. 3, 1998.

Lindsay, Jeff. "The Historic Use of Computerized Tools for Marketing and Market Research: A Brief Survey". Kimberly-Clark Corporation. Dec. 27, 2001. <http://www.jefflindsay.com/market-research.shtml>.

Hello Direct Store Joins eBay Network of Merchants; Customers Bid for Savings on Premier Headsets, Conferencing Equipment, and Other Name-Brand Telephony and Communications Products; PR Newswire; May 23, 2002.

Ohlson, Kathleen. "Looking Behind, Beyond B2B Marketplace Woes"; Network World Fusion; Jun. 11, 2001. <http://www.networkworld.com/archive/2001/119669_06-11-2001.html>.

Patel, Jeetu. "New Platform Options Fuel E-Commerce"; Information Week Online. Mar. 27, 2000. <http://www.informationweek.com/779/ecommerce.htm>.

Pressler, Margaret, "Sells on eBay; Housewife finds herself head of multinational software firm", Washing Post, Proquest # 44484325, Sep. 5, 1999.

Preist, Chris; Adaptive Agents in a Persistent Shout Double Auction; HP Laboratories Bristol, HPL—2003-242; Dec. 4, 2003.

Warbelow, A. et al., "Aucnet: TV Auction Network System", Source: Harvard Business School; 16 pages. Publication Date: Jul. 19, 1989. Prod. #: 190001-PDF-ENG.

Yahoo! Launches Three New European Auctions Services; Yahoo! Italy, Yahoo! Spain and Yahoo! Sweden Unveil New Local Auctions; Santa Clara, Calif.—Sep. 23, 1999.

(56) References Cited

OTHER PUBLICATIONS

Grubbs, L. "Top 5 auction utilities", PC World.com, San Francisco, CA (Dec. 4, 2000).

M2 Presswire, "United Technologies; UTC's Carrier Corp. teams with FreeMarkets to create largest Asian-based B2B online auction market to date; UTC Division identifies average annal savings of more than 16 percent on electirc motors through Free Markets B2B eMarketpla", M2 Presswire, (Mar. 21, 2000.

Jodi Mardesich; Onsale Takes Auction Gavel Electronic; Site Offers Clearance for End-of-Life Products. (Onsale Internet Auction Site) (Company Business and Market; Jul. 8, 1996.

Kevin Merrill; GE Capital to Extend Integrator Buying Spree. (GE Capital Technology Management Services to Acquire Compunet Computer AG); Jul. 8, 1996.

Valerie Block; Going going, virtually gone; Crain's New York Business; May 18, 2008.

Mitsubishi Venture, Wells Fargo Partner to Offer Multi-Currency E-Commerce Storefront; Santa Clara, Calif., and San Francisco, Mar. 1 /PRNewswire/.

Peerflix Trading Platform Manages Over One Million DVD Records; Legal Peer to Peer Platform Grows to Over One Million Combined DVDs Available and Requested for Trade Enabling Several Members to Swap Over One Thousand DVDs Each; BusinessWire; Jun. 8, 2006.

PSINet Teams with WorldPay Ltd. to Launch the World's First Secure Multi-Currency Solution for International Electronic Commerce; PRNewswire; Oct. 6, 1997.

Brown, Janelle; "What does it take to make a buck off of Usenet?" http://www.salon.com/1999/05/24/deja/ May 24, 1999.

Yahoo! Regional: Countries: Afghanistan; http://www.web.archive.org/web/20060923045804/http://dir.yahoo.com/Regional/countries/afghanistan; Jun. 16, 1997.

Yahoo! Regional: Countries: Sweden; http://www.web.archive.org/web/19970616194441/www.yahoo.com/Regional/countries/sweden; Jun. 16, 1997.

Yahoo! Auctions Celebrates One-Year Anniversary; As Online Auction Usage Continues to Grow, Yahoo! is Quickly Becoming the World Marketplace of the New Millenium; Sep. 14, 1999.

"U.S. Appl. No. 09/734,044 Final Office Action mailed Jan. 4, 2008, 15 pgs".

"U.S. Appl. No. 09/734,044, Response filed Oct. 18, 2007 to Non-Final Office Action mailed Sep. 13, 2007, 17 pgs."

"U.S. Appl. No. 09/734,044, Response filed Mar. 4, 2008 to Final Office Action mailed Jan. 4, 2008, 15 pgs".

"U.S. Appl. No. 09/734,044 Advisory Action Mailed May 2, 2008, 3 pgs".

"U.S. Appl. No. 09/602,110, Final Office Action mailed Mar. 8, 2006, 11 pgs".

"U.S. Appl. No. 09/602,110, Final Office Action mailed Nov. 21, 2005, 11 pgs".

"U.S. Appl. No. 09/602,110, Non Final Office Action mailed Jan. 21, 2004, 13 pgs".

"U.S. Appl. No. 09/602,110, Response filed Jan. 3, 2005 to Final Office Action mailed Sep. 2, 2004, 16 pgs".

"U.S. Appl. No. 09/602,110, Response filed Jan. 23, 2006 to Final Office Action mailed Nov. 21, 2005, 15 pgs".

"U.S. Appl. No. 09/602,110, Response filed May 8, 2006 to Final Office Action mailed Mar. 8, 2006, 17 pgs".

U.S. Appl. No. 09/602,110 Advisory Action mailed May 26, 2006, 3 pgs.

"U.S. Appl. No. 09/602,110 Final Office Action mailed Sep. 2, 2004, 13 pgs".

"U.S. Appl. No. 09/602,110 Response filed Aug. 4, 2005 to Non Final Office Action mailed Apr. 5, 2005, 19 pgs".

Edwards, Mark J. "Your Web Browser is Bugged"; Windows IT Pro; Jul. 12, 2000. <http://www.windowsitpro.com/print/security/your-web-browse-bugged>.

Hoeschen, Brad; Brookfield Square hopes mall card strikes a chord. (Brookfield Square Shopping Center; credit card); The Business Journal; Sep. 12, 1997.

Ivanov et al; Design aesthetics leading to m-loyalty in mobile commerce; Emerald; Information & Management; Dec. 2006; vol. 43; Issue 8; pp. 950-963.

Jayaram et al; Arbitrage, cointegration, and the joint dynamics of prices across discrete commodity futures auctions; The University of Scranton; Sep. 7, 1999.

CONVERSION OF LOYALTY POINTS FOR GAMING TO A DIFFERENT LOYALTY POINT PROGRAM FOR SERVICES

CROSS-REFERENCE TO RELATED APPLICATIONS

This application is a continuation of U.S. application Ser. No. 13/863,556 now issued as U.S. Pat. No. 8,511,550 (filed 16 Apr. 2013), U.S. application Ser. No. 13/899,023 now issued as U.S. Pat. No. 8,523,064 (filed 21 May 2013). U.S. application Ser. No. 13/532,342 now issued as U.S. Pat. No. 8,297,502 (filed 25 Jun. 2012), and U.S. application Ser. No. 13/420,255 now issued as U.S. Pat. No. 7,703,673 (filed 25 May 2006). U.S. Pat. Nos. 8,511,550 and 8,523,064 have received an issue notification. U.S. Pat. Nos. 8,297,502 and 7,703,673 have been issued.

Additionally, our claim to the priority date is also through pending U.S. Applications No. 13/681, 479 and U.S. application Ser. No. 13/681, 493, which are continuation-in-part applications that claim the benefit of U.S. Pat. No. 8,342,399 and U.S. Pat. No. 8,376,224.

U.S. Pat. No. 8,376,224 is a continuation-in-part application claiming the benefit of U.S. Pat. Nos. 7,703,673; 8,123, 127; and 8,162,209.

U.S. Pat. No. 8,342,399 is a continuation-in-part application claiming the benefit of U.S. Pat. Nos. 7,703,673; 8,123, 127; and 8,162,209.

Thus, there is a continuous chain of active U.S. cases from the applications back to U.S. Pat. No. 7,703,673, which was filed on May 25, 2006, which the present case is a continuation of—hence claiming the benefit of priority to this case (U.S. Pat. No. 7,703,673) is proper. The above cited applications/patents in the family (all having the U.S. Pat. No. 7,703, 673 as a parent application), are incorporated herein by reference in their entirety.

BACKGROUND

The present disclosure relates to the field of graphical user interfaces for exchanging non-negotiable credits for entity independent funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
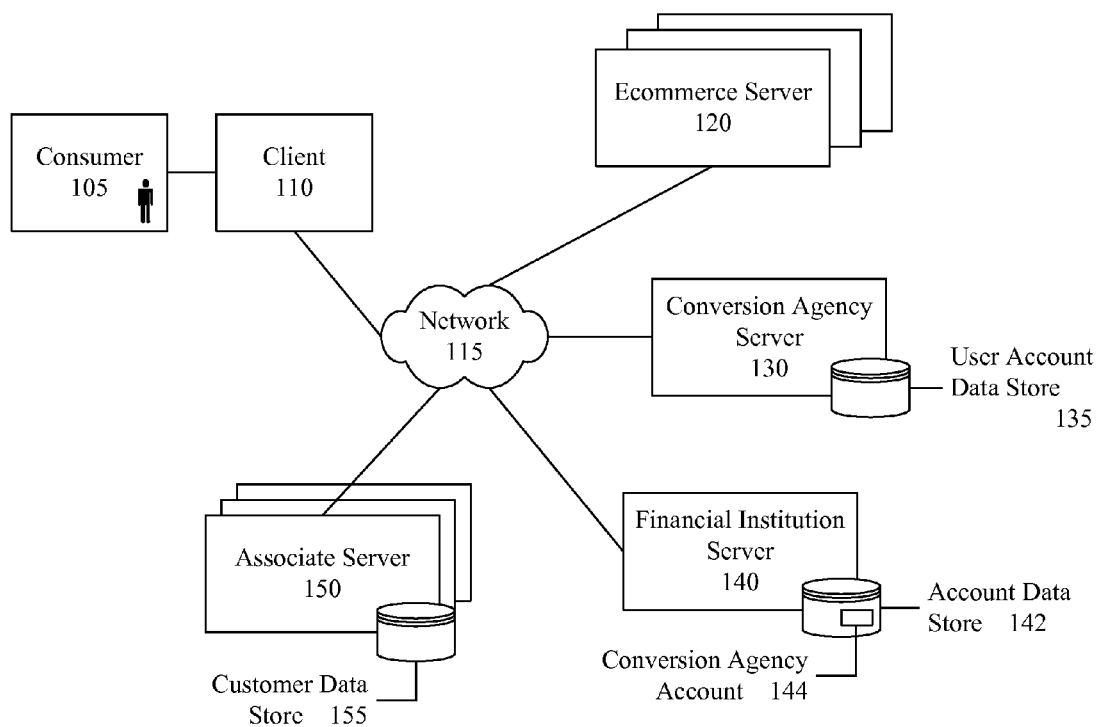
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits (loyalty points of a loyalty program) provided by an entity to negotiable funds (different loyalty points of a different loyalty program) in an approximately immediate fashion using the Web. In one embodiment, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previous interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

According to one aspect of the disclosure (one contemplated embodiment), a web server or other computer can serve Web pages to client-side machines. The client-side machines can run browsers, which render the Web pages. That is the browsers can read the Web pages to create an interactive user interfaces, which is a man-to-machine interface. Upon being rendered within one of the client-side browsers a corresponding user interface for the client-side browser can presents a quantity of member earned loyalty points for the loyalty program. Upon being rendered within one of the client-side browsers the user interface presents a conversion option permitting one of the members to: convert quantities of the loyalty points into quantities of different loyalty points of a different loyalty program of a commerce partner; convert quantities of the different loyalty points into quantities of the loyalty points, or convert quantities of the loyalty points into quantities of different loyalty points and to convert quantities of different loyalty points into quantities of loyalty points. The computer (serving the Web pages) responsive to receiving a message indicating a selection of the conversion option, can process the selection to effectuate changes in the served set of Web pages. Responsive to the processing, the computer serves one or more Web pages or Web page updates that include the effectuated changes to at least one of the one or more client machines. Upon being rendered within one of the client-side browsers the user interface is updated with the effectuated changes. The updated user interface presents a changed quantity of the loyalty points possessed by one of the members. The changed quantity results at least in part from a conversion performed responsive to the selection of the conversion option. The computer serves the set of one or more Web pages, receives the selection, and serves the one or more Web pages or Web page updates that include the effectuated changes within a single user-interactive Web session.

In one embodiment, an agreement can exist between the entity and the commerce partner. The agreement can permit members to: convert quantities of the loyalty points into quantities of the different loyalty points; convert quantities of the different loyalty points into the loyalty points, or convert quantities of the loyalty points into quantities of different loyalty points and to convert quantities of different loyalty points into quantities of loyalty points. The agreement can specify that the entity or the commerce partner are to provide compensation to the other in an agreed upon amount for conversions between the loyalty points and the different loyalty points In one embodiment, the loyalty points are referred to as non-negotiable credits. The entity can redeem the loyalty points in exchange for a restricted set of goods or services provided by the entity to the members as part of the loyalty program. In one embodiment, the entity can be a financial service company that provides credit cards to a set of members. Usage of the credit cards with retailers accepting the credit card earn loyalty points for the loyalty program as recorded in a credit account of a corresponding one of the members. In one embodiment, the entity can be a company that provides a computer implemented game, a platform upon which the computer implemented game runs, or gaming services for the computer implemented game. Playing the computer implemented game can earn loyalty points for the loyalty program as recorded in a credits account of a corresponding one of the members. In other embodiments, the entity can be a hotel, airlines, a rental car company, a train transportation company, a bus lines, a cruise ship company, and the like.

In one embodiment, the different loyalty points are referred to as entity independent funds and are recorded in a funds account. The different loyalty points can be redeemable for commerce partner services that the commerce partner provides to members of the different loyalty program. The commerce partner services are not included in the restricted set of goods or services, wherein the commerce partner services for which the different loyalty points are redeemable may include: travel services for an airline owned, operated, or managed by the commerce partner or by a subsidiary or parent of the commerce partner, lodging services for a hotel owned, operated, or managed by the commerce partner or by a subsidiary or parent of the commerce partner, travel services for a train owned, operated, or managed by the commerce partner or by a subsidiary or parent of the commerce partner, travel services for a cruise ship owned, operated, or managed by the commerce partner or by a subsidiary or parent of the commerce partner, vehicle rental services for a vehicle owned, operated, or managed by the commerce partner or by a subsidiary or parent of the commerce partner, financial services for a final service company that provides credit cards to a set of members wherein usage of the credit cards with retailers accepting the credit cards earn different loyalty points for the different loyalty program, gaming services or virtual items for a computer implemented game or a platform upon which the computer implemented game runs, wherein the computer implemented game or the platform is owned, operated or managed by the commerce partner, or combinations of one or more of any of the travel services, the lodging services, the vehicle rental services, gaming services or the financial services.

In one embodiment, the funds account is neither owned nor controlled by the entity or by any subsidiary or parent of the entity. The credit account is neither owned nor controlled by the commerce partner or by any subsidiary or parent of the commerce partner.

In embodiments, the computer providing Web pages permitting conversions of points between different programs can be a computer of the entity, of the commerce partner, of agents of either the entity or commerce partner, or of a third party. In one embodiment, a computer for one of the loyalty programs can detect user interactions that earn loyalty points and can add points to the credits accounts and/or the funds account in response to the point earning interactions. In one embodiment, cross marketing arrangements can exist between the commerce partner and the entity regarding the loyalty program and the different loyalty program. One cross marketing opportunity is to convert the different loyalty points to/from the loyalty points. Another cross marketing opportunity is to purchase loyalty points (if you are the commerce partner) or different loyalty points (if you are the entity) to give to members. For example, earning opportunities per the loyalty program of the entity can result in the member of the loyalty program earning different loyalty points of the different loyalty program—due to a cross marketing arrangement. Thus, a hotel (one loyalty program) can, in one embodiment, provide hotel loyalty point members with frequent flier miles (different loyalty program of a commerce partner) for staying in the hotel.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns five hundred credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
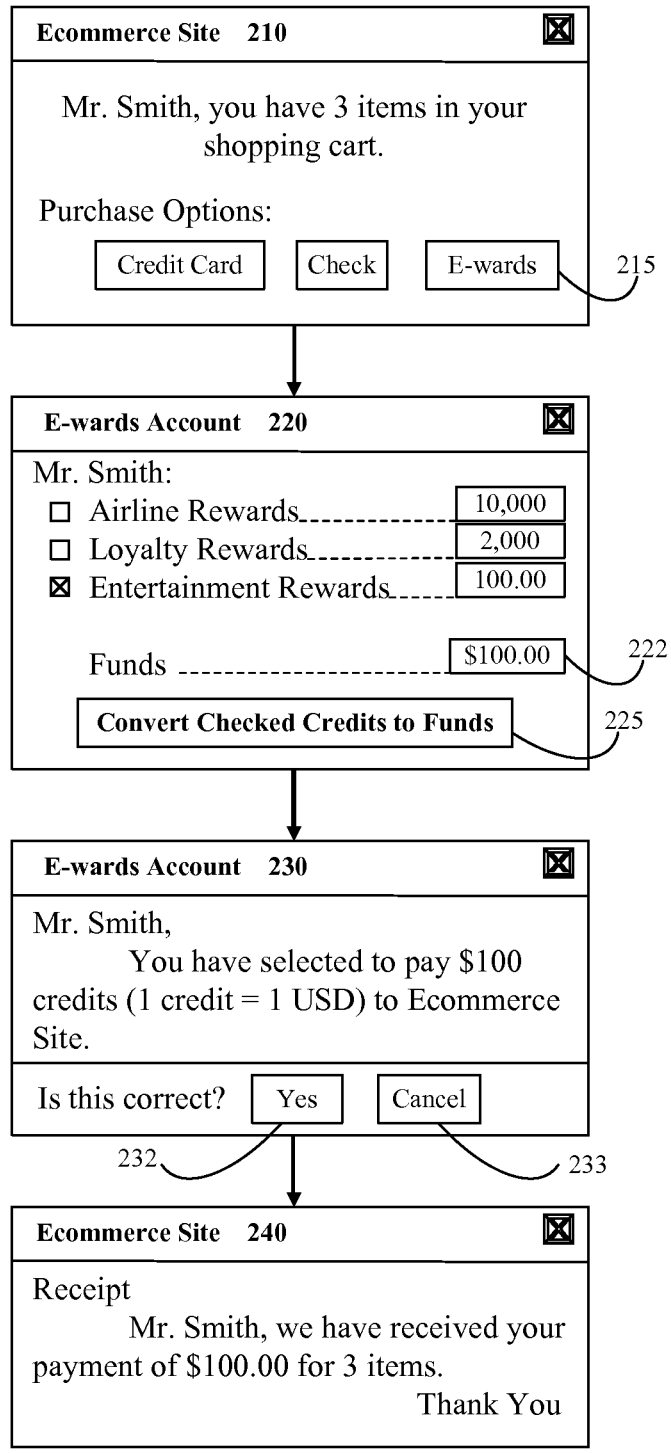
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
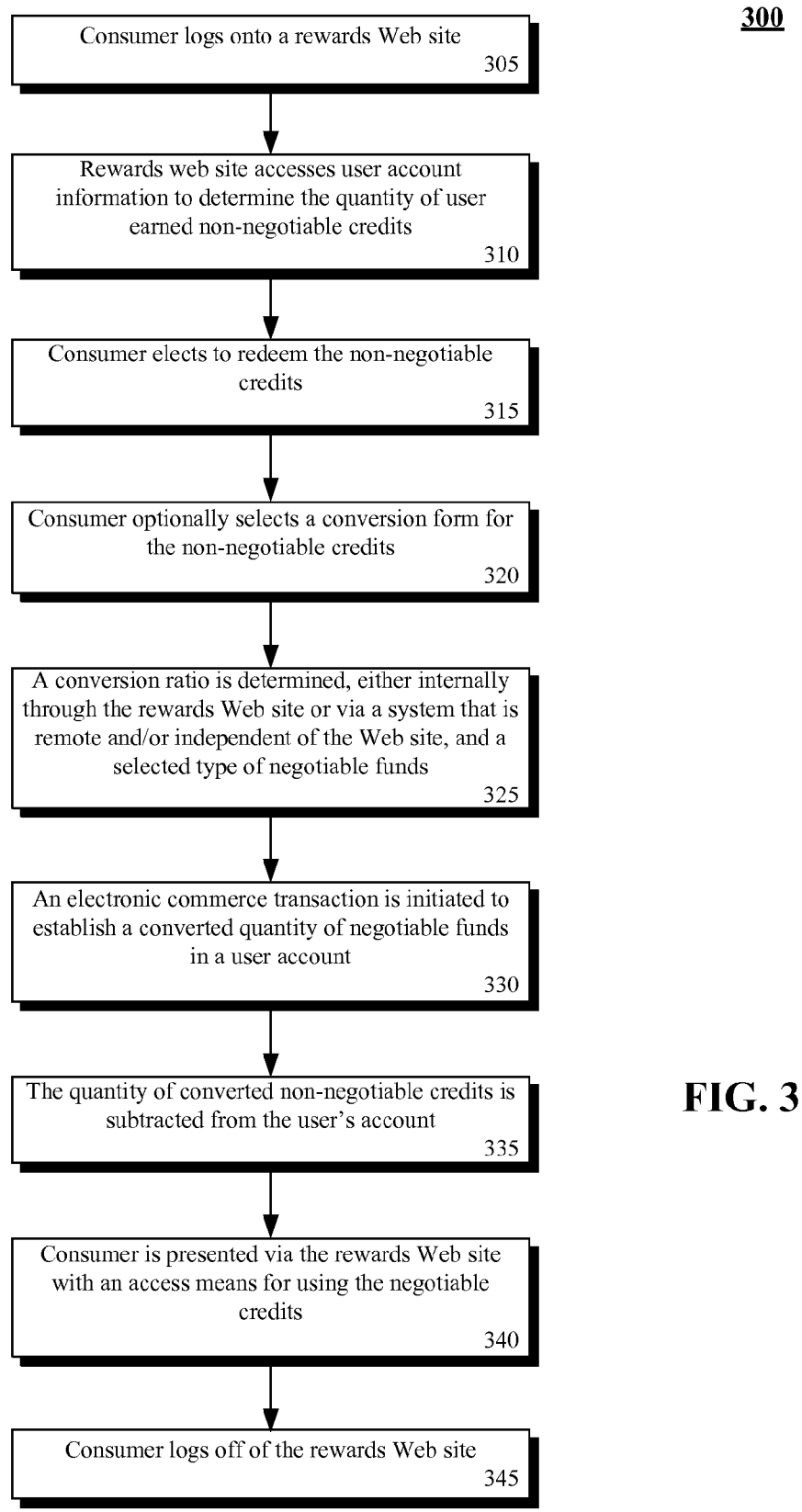
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs on toa rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
a computer serving a set of one or more Web pages for a loyalty program of a company that provides a computer implemented game, a platform upon which the computer implemented game runs, or gaming services for the computer implemented game, wherein playing the computer implemented game earns loyalty points for the loyalty program as recorded in a credits account of a corresponding one of the members, wherein the company is referred to as an entity, wherein the loyalty points are referred to as non-negotiable credits, wherein the Web pages are able to be rendered by one or more client-side browsers, which run on the one or more client-machines, wherein upon being rendered within one of the client-side browsers a corresponding user interface for the client-side browser presents a quantity of member earned loyalty points for the loyalty program, wherein the entity redeems the loyalty points via the Web pages in exchange for a restricted set of goods or services provided by the entity to the members as part of the loyalty program, wherein upon being rendered within one of the client-side browsers the user interface presents a conversion option permitting one of the members to:
  a) convert quantities of the loyalty points into quantities of different loyalty points of a different loyalty program of a commerce partner; or
  b) convert quantities of the different loyalty points into quantities of the loyalty points, or c) convert quantities of the loyalty points into quantities of different loyalty points and to convert quantities of different loyalty points into quantities of loyalty points, wherein the different loyalty points are referred to as entity independent funds and are recorded in a funds account, wherein the different loyalty points are redeemable for commerce partner services that the commerce partner provides to members of the different loyalty program, wherein the commerce partner services are not included in the restricted set of goods or services, wherein the commerce partner services for which the different loyalty points are redeemable comprise:

a) travel services for an airline owned, operated, or managed by the commerce partner or by a subsidiary or parent of the commerce partner, b) lodging services for a hotel owned, operated, or managed by the commerce partner or by a subsidiary or parent of the commerce partner, c) travel services for a train owned, operated, or managed by the commerce partner or by a subsidiary or parent of the commerce partner, d) travel services for a cruise ship owned, operated, or managed by the commerce partner or by a subsidiary or parent of the commerce partner, e) vehicle rental services for a vehicle owned, operated, or managed by the commerce partner or by a subsidiary or parent of the commerce partner, f) financial services for a final service company that provides credit cards to a set of members wherein usage of the credit cards with retailers accepting the credit cards earn different loyalty points for the different loyalty program, or g) combinations of one of more of any of the travel services, the lodging services, the vehicle rental services, or the financial services as specified by a) through f), wherein the different loyalty program of the commerce partner is a hotel, airline, rental car, train, cruise ship, or a financial service loyalty program, wherein the funds account is neither owned nor controlled by the entity or by any subsidiary or parent of the entity, wherein the credits account is neither owned nor controlled by the commerce partner or by any subsidiary or parent of the commerce partner, wherein the entity does not:

a) accept the different loyalty points as payment for any of the goods or services of the restricted set; or b) accept the different loyalty points as payment for any of the goods or services of the restricted set without quantities of the different loyalty points being converted into quantities of loyalty points, wherein an agreement exists between the entity and the commerce partner, wherein the agreement permits members to:

a) convert quantities of the loyalty points into quantifies of the different loyalty points;

b) convert quantities of the different loyalty points into the loyalty points, or c) convert quantities of the loyalty points into quantities of different loyalty points and to convert quantities of different loyalty points into quantities of loyalty points wherein the agreement specifies that the entity or the commerce partner are to provide compensation to the other in an agreed upon amount for conversions between the loyalty points and the different loyalty points;

the computer responsive to receiving a message indicating a selection of the conversion option, processing the selection to effectuate changes in the served set of Web pages; and responsive to the processing, the computer serving one or more Web pages or Web page updates that include the effectuated changes to at least one of the one or more client machines, wherein upon being rendered within one of the client-side browsers the user interface is updated with the effectuated changes, wherein the updated user interface presents a changed quantity of the loyalty points possessed by one of the members, said changed quantity resulting at least in part from a conversion performed responsive to the selection of the conversion option, wherein the computer serves the set of one or more Web pages, receives the selection, and serves the one or more Web pages or Web page updates that include the effectuated changes within a single user-interactive Web session.

2. The method of claim 1, wherein upon being rendered within one of the client-side browsers the user interface presenting the conversion option permitting one of the members to convert quantities of the loyalty points into quantities of the different loyalty points, wherein the agreement permits members of the loyalty program to convert quantities of the loyalty points into quantities of the different loyalty points, wherein the updated user interface presents a reduced quantity of loyalty points possessed by one of the members, said reduced quantity resulting from quantities of the loyalty points being converting into quantities of the different loyalty points.

3. The method of claim 1, wherein upon being rendered within one of the client-side browsers the user interface presenting the conversion option permitting one of the members to convert quantities of the different loyalty points into quantities of the loyalty points, wherein the agreement permits members of the loyalty program to convert quantities of the different loyalty points into quantities of the loyalty points, wherein the updated user interface presents an increased quantity of loyalty points possessed by one of the members, said increased quantity resulting from quantities of the different loyalty points being converted into quantities of the loyalty points.

4. The method of claim 1, wherein the Web pages do not permit any of the members to redeem quantities of the different loyalty points for the commerce partner services, wherein redeeming the different loyalty points for the commerce partner services occurs through a set of Web pages not owned or controlled by the entity and not owned or controlled by any subsidiary or parent of the entity.

5. The method of claim 1, further comprising:

the computer serving a subset of the Web pages, which are able to be rendered in one of the client side browsers, which upon being rendered within one of the client side browsers causes the user interface to present an e-commerce shopping cart to one of the members, wherein the e-commerce shopping cart comprises one or more goods or services of the restricted set, wherein the e-commerce shopping cart includes member placed items pending a purchase by one of the members, wherein at least a portion of the purchase is conducted by one of the members expending a portion of the loyalty points possessed by that member for the purchase, wherein the conversion option is provided on a same Web page that includes the shopping cart, wherein the conversion option permits quantities of the different loyalty program points to be converted into quantities of the loyalty program points, wherein resulting increases in quantities of the loyalty points are for paying for the member placed items in the shopping cart, wherein the changed quantity is presented via a Web page that also concurrently presents a cost of the member placed items, wherein a portion of the changed quantity of loyalty points are applied to the cost of the purchase.

6. The method of claim 1, wherein playing or purchasing the computer implemented game earns corresponding members quantities of different loyalty points due to a cross marketing arrangement between the entity and the commerce partner, wherein the entity compensates the commerce partner for the quantities of the different loyalty points that the card using members earns through playing or purchasing the computer implemented game.

7. A method comprising:
a computer serving a set of one or more Web pages for a different loyalty program of a commerce partner to one or more remotely located client machines, wherein the different loyalty program of the commerce partner is a hotel, airline, rental car, train, cruise ship, or financial services loyalty program, wherein the Web pages are able to be rendered by one or more client-side browsers, which run on the one or more client-machines, wherein upon being rendered within one of the client-side browsers a corresponding user interface for the client-side browser presents a quantity of member earned different loyalty points for the different loyalty program, wherein the different loyalty points are referred to as entity independent funds and are recorded in a funds account of the members, wherein the commerce partner redeems the different loyalty points for members via the Web pages in exchange for a set of commerce partner services, wherein the commerce partner services for which the different loyalty points are redeemable comprise:
  a) travel services for an airline owned, operated, or managed by the commerce partner or by a subsidiary or parent of the commerce partner,
  b) lodging services for a hotel owned, operated, or managed by the commerce partner or by a subsidiary or parent of the commerce partner,
  c) travel services for a train owned, operated, or managed by the commerce partner or by a subsidiary or parent of the commerce partner,
  d) travel services for a cruise ship owned, operated, or managed by the commerce partner or by a subsidiary or parent of the commerce partner,
  e) vehicle rental services for a vehicle owned, operated, or managed by the commerce partner or by a subsidiary or parent of the commerce partner,
  f) financial services for a final service company that provides credit cards to a set of members wherein usage of the credit cards with retailers accepting the credit cards earn different loyalty points for the different loyalty program, or
  g) combinations of one of more of any of the travel services, the lodging services, the vehicle rental services, or the gaming services as specified by a) through f),
wherein upon being rendered within one of the client-side browsers the user interface presents a conversion option permitting one of the members to:
  a) convert quantities of the different loyalty points into quantities of loyalty points of company that provides a computer implemented game, that provides a platform upon which the computer implemented game runs, or that provides gaming services for the computer implemented game,
  b) convert quantities of the loyalty points into quantities of the loyalty points, or
  c) convert quantities of the loyalty points into quantities of different loyalty points and to convert quantities of different loyalty points into quantities of loyalty points,
wherein loyalty points for the loyalty program are earned through playing the computer implemented game as recorded in a credits account of a corresponding one of the members, wherein the company is referred to as an entity, wherein the loyalty points are referred to as non-negotiable credits, wherein the loyalty points are redeemable for a restricted set of goods or services for the computer implemented game per terms of the loyalty program, wherein the commerce partner services are not in the restricted set of goods or services, wherein the funds account is neither owned nor controlled by the entity or by any subsidiary or parent of the entity, wherein the credits account is neither owned nor controlled by the commerce partner or by any subsidiary or parent of the commerce partner, wherein the commerce partner does not:
  a) accept the loyalty points as payment for any of the commerce partner services; or
  b) accept the loyalty points as payment for any of the commerce partner services without quantities of the loyalty points being converted into quantities of the different loyalty points,
wherein an agreement exists between the commerce partner and the entity, wherein the agreement permits members to:
  a) convert quantities of the different loyalty points into quantifies of the loyalty points,
  b) convert quantities of the loyalty points into quantities of the different loyalty points, or
  c) convert quantities of the loyalty points into quantities of different loyalty points and to convert quantities of different loyalty points into quantities of loyalty points,
wherein the agreement specifies that the commerce partner or the entity are to provide compensation to the other in an agreed upon amount for conversions between the different loyalty points and the loyalty points;
the computer responsive to receiving a message indicating a selection of the conversion option, processing the selection to effectuate changes in the served set of Web pages; and
responsive to the processing, the computer serving one or more Web pages or Web page updates that include the effectuated changes to at least one of the one or more client machines, wherein upon being rendered within one of the client-side browsers the user interface is updated with the effectuated changes, wherein the updated user interface presents a changed quantity of the different loyalty points possessed by one of the members, said changed quantity resulting at least in part from a conversion performed responsive to the selection of the conversion option, wherein the computer serves the set of one or more Web pages, receives the selection, and serves the one or more Web pages or Web page updates that include the effectuated changes within a single user-interactive Web session.

8. The method of claim 7, wherein upon being rendered within one of the client-side browsers the user interface presenting the conversion option permitting one of the members to convert quantities of the different loyalty points into quantities of the loyalty points, wherein the agreement permits members of the different loyalty program to convert quantities of the different loyalty points into quantities of the loyalty points, wherein the updated user interface presents a reduced quantity of different loyalty points possessed by one of the members, said reduced quantity resulting from quantities of the different loyalty points being converting into quantities of the loyalty points.

9. The method of claim 7, wherein upon being rendered within one of the client-side browsers the user interface presenting the conversion option permitting one of the members to convert quantities of the loyalty points into quantities of the different loyalty points, wherein the agreement permits members of the different loyalty program to convert quantities of the loyalty points into quantities of the different loyalty points, wherein the updated user interface presents an increased quantity of different loyalty points possessed by one of the members, said increased quantity resulting from quantities of the loyalty points being converted into quantities of the different loyalty points.

10. The method of claim 7, wherein the Web pages do not permit any of the members to redeem quantities of the loyalty points for the goods or services of the restricted set, wherein redeeming the loyalty points for the goods or services of the restricted set occurs through a set of Web pages not owned or controlled by the commerce partner and not owned or controlled by any subsidiary or parent of the commerce partner.

11. The method of claim 7, further comprising:
the computer serving a subset of the Web pages, which are able to be rendered in one of the client side browsers, which upon being rendered within one of the client side browsers causes the user interface to present an e-commerce shopping cart to one of the members, wherein the e-commerce shopping cart comprises one or more commerce partner services, wherein the e-commerce shopping cart includes member placed items pending a purchase by one of the members, wherein at least a portion of the purchase is conducted by one of the members expending a portion of the different loyalty points possessed by that member for the purchase, wherein the conversion option is provided on a same Web page that includes the shopping cart, wherein the conversion option permits quantities of the loyalty program points to be converted into quantities of the different loyalty program points, wherein resulting increases in quantities of the different loyalty points are for paying for the member placed items in the shopping cart, wherein the changed quantity is presented via a Web page that also concurrently presents a cost of the member placed items, wherein a portion of the changed quantity of different loyalty points are applied to the cost of the purchase.

12. The method of claim 7, playing or purchasing the computer implemented game earns corresponding members quantities of different loyalty points due to a cross marketing arrangement between the commerce partner and the entity, wherein the commerce partner receives compensation from the entity for the quantities of the different loyalty points that members earns through playing the computer implemented game.

13. A method comprising:
establishing a contract between a company and a commerce partner permitting members of a loyalty program to:
a) convert quantities of loyalty points of the loyalty program into quantifies of different loyalty points of a different loyalty program of the commerce partner,
b) convert quantities of the loyalty points into quantities of the different loyalty points, or
c) convert quantities of the loyalty points into quantities of different loyalty points and to convert quantities of different loyalty points into quantities of loyalty points, wherein per the contract the company and the commerce partner compensate each other on a per point basis for converting member points, wherein the company is referred to as an entity, wherein the loyalty points are referred to as non-negotiable credits, wherein the company is a company that provides a computer implemented game, a platform upon which the computer implemented game runs, or gaming services for the computer implemented game, wherein playing the computer implemented game earns loyalty points for the loyalty program as recorded in a credits account of a corresponding one of the members, wherein the different loyalty points are referred to as entity independent funds, wherein said loyalty points are:
a) possessed by the members as a benefit of membership in the loyalty program,
b) are maintained in a credits account for the loyalty program, and
c) are subject to terms and conditions of the loyalty program, wherein said different loyalty points are:
a) possessed by the members as a benefit of membership in the different loyalty program,
b) are maintained in a funds account for the different loyalty program, and
c) are subject to terms and conditions of the different loyalty program, wherein the credits account is neither owned nor controlled by the commerce partner or by a subsidiary or parent of the commerce partner, wherein the funds account is neither owned nor controlled by the entity or by a subsidiary or parent of the entity, wherein the entity redeems the loyalty points for the members in exchange for a restricted set of goods or services provided by the entity as part of the loyalty program, wherein the different loyalty points are redeemable in exchange for commerce partner services provided by the commerce partner as part of the different loyalty program, wherein the commerce partner services for which the different loyalty points are redeemable comprise:
a) travel services for an airline owned, operated, or managed by the commerce partner or by a subsidiary or parent of the commerce partner,
b) lodging services for a hotel owned, operated, or managed by the commerce partner or by a subsidiary or parent of the commerce partner,
c) travel services for a train owned, operated, or managed by the commerce partner or by a subsidiary or parent of the commerce partner,
d) travel services for a cruise ship owned, operated, or managed by the commerce partner or by a subsidiary or parent of the commerce partner,
e) vehicle rental services for a vehicle owned, operated, or managed by the commerce partner or by a subsidiary or parent of the commerce partner,
f) financial services for a final service company that provides credit cards to a set of members wherein usage of the credit cards with retailers accepting the credit cards earn different loyalty points for the different loyalty program, or g) combinations of one of more of any of the travel services, the lodging services, the vehicle rental services, or the gaming services as specified by a) through f), wherein the different loyalty program of the commerce partner is a hotel, airline, rental car, train, cruise ship, or a financial services loyalty program, wherein the entity does not:
  a) accept the different loyalty points as payment for any of the goods or services of the restricted set; or
  b) accept the different loyalty points as payment for any of the goods or services of the restricted set without quantities of the different loyalty points being converted into quantities of loyalty points, a computer detecting a set of two or more interactions earning additional loyalty points for one of the members in accordance with terms-of-use of the loyalty program, wherein the two or more interactions are ones where one of the members earn loyalty points by playing the computer implemented game, wherein the computer adds the additional loyalty points to the credits account of a member earning the additional loyalty points; and responsive to an indication of a conversion operation occurrence, the computer changing a quantity of loyalty points in the credits account, a changed quantity from the changing being:
  a) a quantity of loyalty points lost by converting quantities of the loyalty points to quantities of the different loyalty points, or
  b) a quantity of loyalty points gained by converting quantities of the different loyalty points to quantities of the loyalty points, wherein the funds account changes by a quantity of different loyalty points in an inversely proportional manner to the change of the loyalty points in the credits account as a result of the conversion operation.

14. The method of claim 13, wherein the computer performing the conversion operation is a computer of the loyalty program, wherein the computer permits member redemption of the loyalty points in exchange for goods or services of the restricted set, wherein the computer does not permit member redemption of the different loyalty points for the commerce partner services.

15. The method of claim 13, wherein the computer performing the conversion operation is a computer of the different loyalty program, wherein the computer permits member redemption of the different loyalty points in exchange for the commerce partner services, wherein the computer does not permit member redemption of the loyalty points for the goods or services of the restricted set.

16. The method of claim 13, wherein responsive to the computer detecting the set of two or more interactions, the computer causing additional different loyalty points to be added to the funds account of the member in accordance with terms-of-use of the loyalty program due to a cross marketing arrangement between the entity and the commerce partner, wherein the entity compensates the commerce partner for the quantities of the different loyalty points that the members earns through the set of two or more interactions.

17. The method of claim 13, wherein the indication of the conversion occurrence is a result of a selection of a conversion option presented in a user interface of a client-side browser that renders a set of Web pages served by the computer, wherein before the conversion operation occurrence the user interface presents per-conversion quantity of loyalty points in the credits account, wherein after the conversion operation occurrence the user interface presents a post-conversion quantity of loyalty points in the credits account, said post-conversion quantity reflecting the changed quantity, wherein the user interface presents the pre-conversion quantity and the post-conversion quantity in a single interactive Web session.

18. A method comprising:
establishing a contract between a commerce partner and a company permitting members of a different loyalty program to:
  a) convert quantities of different loyalty points of the different loyalty program into quantifies of loyalty points of a loyalty program of the company,
  b) convert quantities of the loyalty points into quantities of the different loyalty points, or
  c) convert quantities of the different loyalty points into quantities of loyalty points and to convert quantities of the loyalty points into quantities of the different loyalty points, wherein per the contract the commerce partner and the company compensate each other on a per point basis for converting member points, wherein the company is referred to as an entity, wherein the loyalty points are referred to as non-negotiable credits, wherein the company is a company that provides a computer implemented game, a platform upon which the computer implemented game runs, or gaming services for the computer implemented game, wherein playing the computer implemented game earns loyalty points for the loyalty program as recorded in a credits account of a corresponding one of the members, wherein the different loyalty points are referred to as entity independent funds, wherein said loyalty points are:
  a) possessed by the members as a benefit of membership in the loyalty program,
  b) are maintained in a credits account for the loyalty program, and
  c) are subject to terms and conditions of the loyalty program, wherein said different loyalty points are:
  a) possessed by the members as a benefit of membership in the different loyalty program,
  b) are maintained in a funds account for the different loyalty program, and
  c) are subject to terms and conditions of the different loyalty program, wherein the credits account is neither owned nor controlled by the commerce partner or by a subsidiary or parent of the commerce partner, wherein the funds account is neither owned nor controlled by the entity or by a subsidiary or parent of the entity, wherein the loyalty points entity are redeemed for the members in exchange for a restricted set of goods or services provided by the entity as part of the loyalty program, wherein the commerce partner redeems the different loyalty points in exchange for commerce partner services provided by the commerce partner as part of the different loyalty program, wherein the commerce partner services for which the different loyalty points are redeemable comprise:
  a) travel services for an airline owned, operated, or managed by the commerce partner or by a subsidiary or parent of the commerce partner,
  b) lodging services for a hotel owned, operated, or managed by the commerce partner or by a subsidiary or parent of the commerce partner,
  c) travel services for a train owned, operated, or managed by the commerce partner or by a subsidiary or parent of the commerce partner, d) travel services for a cruise ship owned, operated, or managed by the commerce partner or by a subsidiary or parent of the commerce partner, e) vehicle rental services for a vehicle owned, operated, or managed by the commerce partner or by a subsidiary or parent of the commerce partner, f) financial services for a final service company that provides credit cards to a set of members wherein usage of the credit cards with retailers accepting the credit cards earn different loyalty points for the different loyalty program, or g) combinations of one of more of any of the travel services, the lodging services, the vehicle rental services, or the gaming services as specified by a) through f), wherein the different loyalty program of the commerce partner is a hotel, airline, rental car, train, cruise ship, or a financial services loyalty program, wherein the commerce partner does not:

a) accept the loyalty points as payment for any of the commerce partner services; or b) accept the loyalty points as payment for any of the commerce partner services without quantities of the loyalty points being converted into quantities of the different loyalty points, a computer detecting a set of two or more interactions earning additional different loyalty points for one of the members in accordance with terms-of-use of the different loyalty program, wherein the computer adds the additional different loyalty points to the funds account of a member earning the additional different loyalty points; and responsive to an indication of a conversion operation occurrence, the computer changing a quantity of different loyalty points in the funds account, a changed quantity from the changing being:

a) a quantity of different loyalty points lost by converting quantities of the different loyalty points to quantities of the loyalty points, or b) a quantity of different loyalty points gained by converting quantities of the loyalty points to quantities of the different loyalty points, wherein the credits account changes by a quantity of loyalty points in an inversely proportional manner to the change of the different loyalty points in the funds account as a result of the conversion operation.

19. The method of claim 18, wherein the computer performing the conversion operation is a computer of the different loyalty program, wherein the computer permits member redemption of the different loyalty points in exchange for commerce partner services, wherein the computer does not permit member redemption of the loyalty points for the goods or services of the restricted set.

20. The method of claim 18, wherein the computer performing the conversion operation is a computer of the loyalty program, wherein the computer permits member redemption of the loyalty points in exchange for the goods or services of the restricted set, wherein the computer does not permit member redemption of the different loyalty points for the commerce partner services.

21. The method of claim 18, wherein responsive to the computer detecting the set of two or more interactions, the computer causing additional loyalty points to be added to the credits account of the member in accordance with terms-of-use of the different loyalty program due to a cross marketing arrangement between the commerce partner and the entity, wherein the commerce partner compensates the entity for the quantities of the loyalty points that the members earns through the set of two or more interactions.

22. The method of claim 18, wherein the indication of the conversion occurrence is a result of a selection of a conversion option presented in a user interface of a client-side browser that renders a set of Web pages served by the computer, wherein before the conversion operation occurrence the user interface presents per-conversion quantity of different loyalty points in the funds account, wherein after the conversion operation occurrence the user interface presents a post-conversion quantity of different loyalty points in the funds account, said post-conversion quantity reflecting the changed quantity, wherein the user interface presents the pre-conversion quantity and the post-conversion quantity in a single interactive Web session.

23. A method comprising:

at least one of one or more computers, which provides a set of Web pages of a Web site for a different loyalty program of a commerce partner, identifying loyalty points earned by a member as part of a loyalty program of an entity, wherein the loyalty program includes a payment artifact, wherein the loyalty points of the loyalty program are earned as a result of having charged amounts to an account linked to the payment artifact, the amounts charged being for goods or services purchased using the payment artifact, wherein the loyalty points are stored in a credits account as digitally encoded information in at least one storage device, wherein the goods or services purchased were purchased from at least one different entity than the entity, wherein said loyalty program of the entity is able to redeem the loyalty points for a restricted list of goods or services, wherein the loyalty points are referred to as non-negotiable credits, wherein the different loyalty points are referred to as entity independent funds and are recorded in a funds account, wherein the different loyalty points are redeemable for commerce partner services that the commerce partner provides to members of the different loyalty program, wherein the commerce partner services are not included in the restricted set of goods or services, wherein the commerce partner services for which the different loyalty points are redeemable comprise:

a) travel services for an airline owned, operated, or managed by the commerce partner or by a subsidiary or parent of the commerce partner, b) lodging services for a hotel owned, operated, or managed by the commerce partner or by a subsidiary or parent of the commerce partner, c) travel services for a train owned, operated, or managed by the commerce partner or by a subsidiary or parent of the commerce partner, d) travel services for a cruise ship owned, operated, or managed by the commerce partner or by a subsidiary or parent of the commerce partner, e) vehicle rental services for a vehicle owned, operated, or managed by the commerce partner or by a subsidiary or parent of the commerce partner, f) financial services for a final service company that provides credit cards to a set of members wherein usage of the credit cards with retailers accepting the credit cards earn different loyalty points for the different loyalty program, g) gaming services or virtual items for a computer implemented game or a platform upon which the computer implemented game runs, wherein the computer implemented game or the platform is owned, operated or managed by the commerce partner, or h) combinations of one of more of any of the travel services, the lodging services, the vehicle rental services, or the financial services as specified by a) through g), wherein the different loyalty program of the commerce partner is a hotel, airline, rental car, train, cruise ship, gaming platform, gaming service, or game-specific loyalty program' at least one of one or more computers receiving, during a Web session involving the member and the Web site, a request to transfer or convert quantities of the loyalty points to quantities of different loyalty points, wherein the commerce partner is a company that is not the entity, during the Web session and responsive to the request to transfer or convert the quantities of loyalty points to quantities of different loyalty points, at least one of one or more computers transferring or converting at least a subset of the loyalty points into quantities of entity independent funds, wherein the commerce partner provides the commerce partner services for sale though the Web site, wherein in absence of the loyalty points being converted or transferred into the different loyalty points, the Web site of the commerce partner does not accept the loyalty points as payment for the commerce partner services.

24. The method of claim 23, wherein the payment artifact is a credit card or debit card.

25. The method of claim 23, wherein per terms of the loyalty program, the loyalty points have no cash or monetary value, wherein the loyalty points are accrued in proportion to the amount charged to the account.

26. The method of claim 23, wherein the loyalty points have a restriction on use related to an expiration date, whereby the loyalty points either have an expiration date, have an expiration date triggered by a previously defined condition related to a status of the account linked to the payment artifact, or the entity has expressly reserved a right of imposing an expiration date on already accrued loyalty points, wherein the restrictions on use of the loyalty points do not apply to the quantities of different loyalty points that result from the transferring or converting.

27. The method of claim 23, wherein the commerce partner agrees to permit transfers or conversions of quantities of loyalty points to different loyalty points in accordance with a fixed credits to funds ratio, wherein the commerce partner receives compensation, per an agreement between the commerce partner and the entity, from the entity for transfers or conversions of quantities of loyalty points into quantities of different loyalty points.

\* \* \* \* \*